(12) United States Patent
Maruyama

(10) Patent No.: US 6,594,222 B2
(45) Date of Patent: Jul. 15, 2003

(54) OBJECTIVE LENS FOR OPTICAL PICK-UP

(75) Inventor: Koichi Maruyama, Tokyo (JP)

(73) Assignee: Pentax Corporation, Tokyo (JP)

( * ) Notice: Subject to any disclaimer, the term of this patent is extended or adjusted under 35 U.S.C. 154(b) by 28 days.

(21) Appl. No.: 09/747,969

(22) Filed: Dec. 27, 2000

(65) Prior Publication Data

US 2001/0008512 A1 Jul. 19, 2001

(30) Foreign Application Priority Data

Dec. 28, 1999 (JP) ............................................. 11-375020

(51) Int. Cl.[7] ................................................. G11B 7/00
(52) U.S. Cl. ................................................. 369/112.26
(58) Field of Search ........................ 369/112.01, 112.03, 369/112.05, 112.06, 112.07, 112.08, 112.11, 112.12, 112.13, 112.23, 112.25, 112.26

(56) References Cited

U.S. PATENT DOCUMENTS

| | | | |
|---|---|---|---|
| 5,838,496 | A | 11/1998 | Maruyama et al. |
| 6,088,322 | A | 7/2000 | Broome et al. |
| 6,118,594 | A | 9/2000 | Maruyama |
| 6,191,889 | B1 | 2/2001 | Maruyama |
| 6,192,021 | B1 | 2/2001 | Saito et al. |
| 2001/0008513 | A1 | 7/2001 | Arai et al. |

FOREIGN PATENT DOCUMENTS

| | | |
|---|---|---|
| JP | 9-179020 | 7/1997 |
| JP | 9-311271 | 12/1997 |
| JP | 10-92010 | 4/1998 |
| JP | 10283668 | 10/1998 |
| JP | 11-16194 | 1/1999 |
| JP | 11-86319 | 3/1999 |
| JP | 11-96585 | 4/1999 |
| JP | 11250490 | 9/1999 |
| JP | 11287948 | 10/1999 |
| JP | 11337818 | 12/1999 |
| JP | 2001-195769 | 7/2001 |

OTHER PUBLICATIONS

English Language Abstract of JP 11–287948.
English Language Abstract of JP 11–250490.
English Language Abstract of JP 11–96585.
English Language Abstract of JP 11–16194.
English Language Abstract of JP 10–283668.
English Language Abstract of JP 10–92010.
English Language Abstract of JP 9–311271.

*Primary Examiner*—Paul W. Huber
(74) *Attorney, Agent, or Firm*—Greenblum & Bernstein, P.L.C.

(57) ABSTRACT

Disclosed is an objective lens of an optical pick-up that includes a refractive lens and a diffractive lens structure that is formed as a large number of concentric ring areas having minute steps in an optical axis direction at the boundaries therebetween. The lens surface of the objective lens is divided into a high NA exclusive area for a DVD only, and a common area that is surrouned by the high NA exclusive area. The diffractive lens structure in the common area changes the spherical aberration in the undercorrected direction as the wavelength of the incident laser beam increases. The diffractive lens structure formed in the high NA exclusive area has a smaller wavelength dependence of a spherical aberration than that formed in the common area, and is designed such that a spherical aberration at the short wavelength is adequately corrected for the thin cover type optical disc.

15 Claims, 15 Drawing Sheets

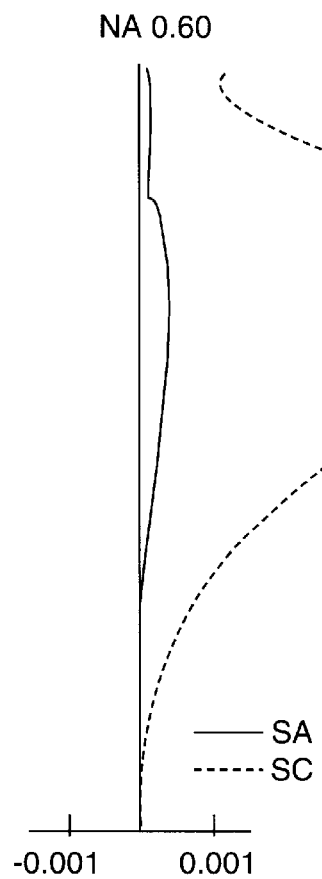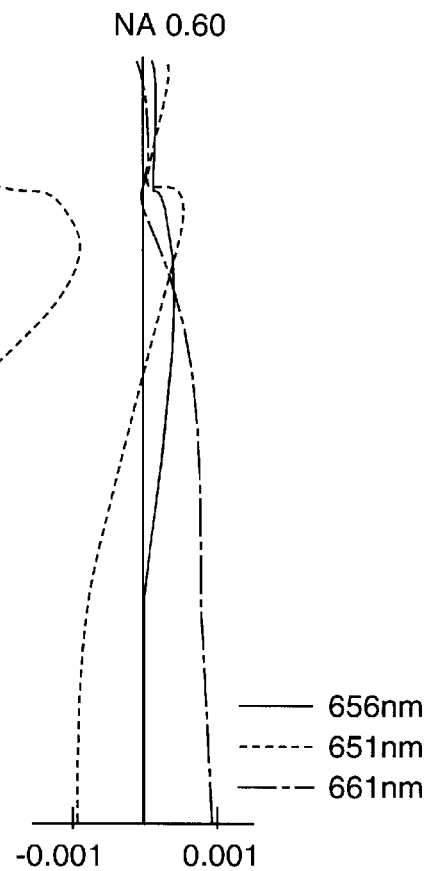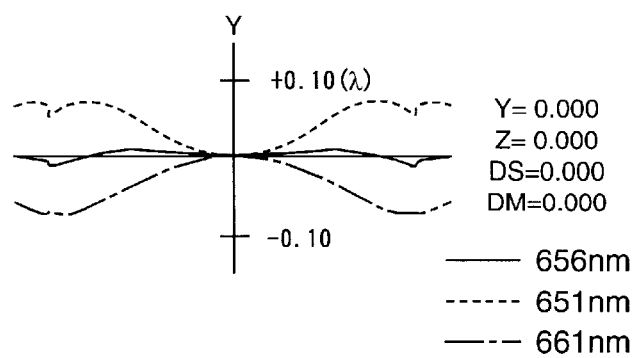

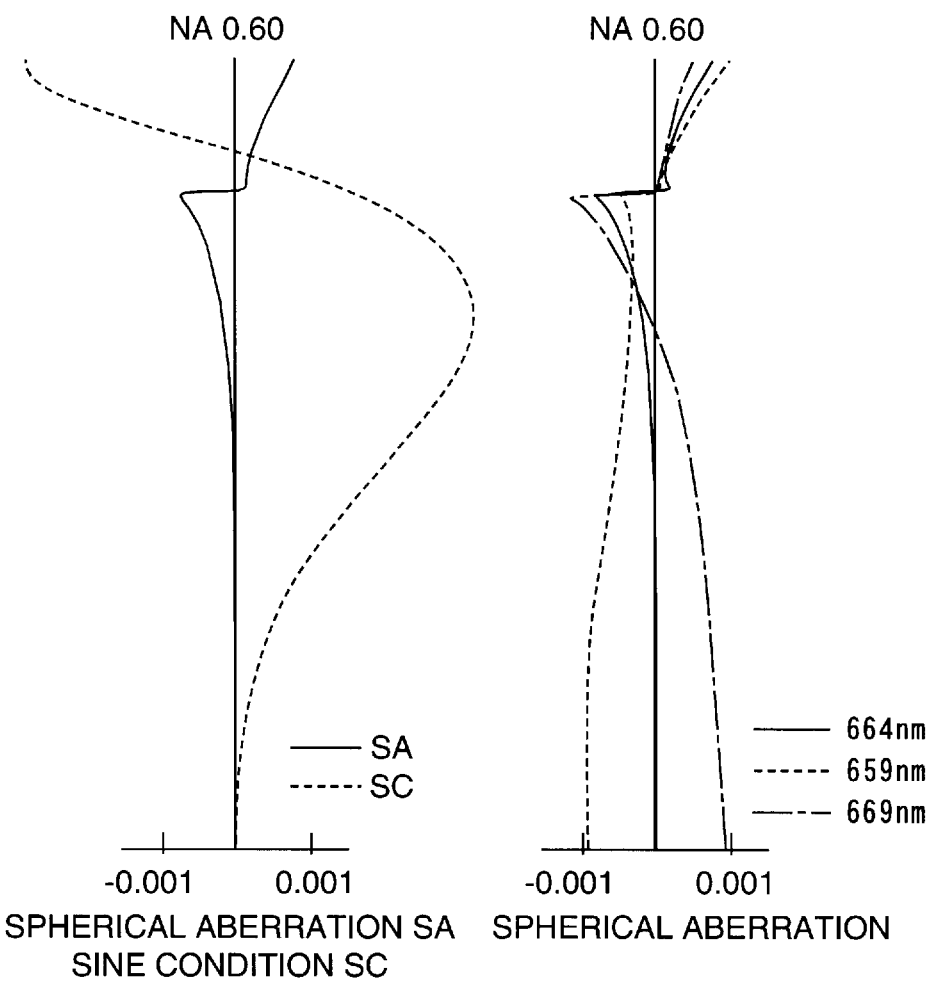
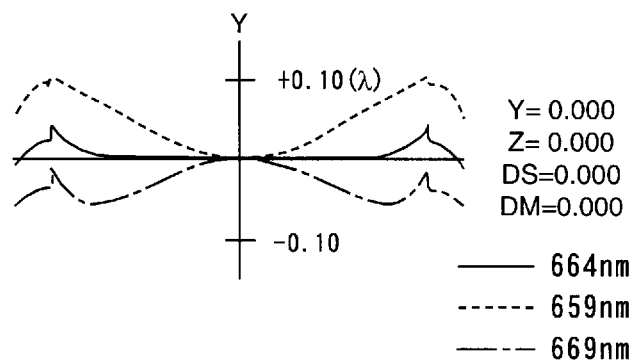

SPHERICAL ABERRATION SA
SINE CONDITION SC

SPHERICAL ABERRATION

NA 0.60

—— SA
----- SC

-0.001    0.001

SPHERICAL ABERRATION SA
SINE CONDITION SC

NA 0.60

—— 659nm
----- 654nm
—·— 664nm

-0.001    0.001

SPHERICAL ABERRATION

Y= 0.000
Z= 0.000
DS=0.000
DM=0.000

—— 659nm
----- 654nm
—·— 664nm

OBJECTIVE LENS FOR OPTICAL PICK-UP

BACKGROUND OF THE INVENTION

The present invention relates to a high NA (numerical aperture) objective lens adapted to an optical pick-up of an optical disc apparatus that is capable of using a plurality of kinds of optical discs whose cover layers are different in thickness. Particularly, the present invention relates to the objective lens that has a diffractive lens structure formed on a surface of a refractive lens.

The optical disc includes an information layer on which digital information is recorded, and a transparent cover layer that covers the information layer.

There are several types of the optical discs. A compact disc (CD) or a CD-recordable (CD-R) has the cover layer whose thickness is 1.2 mm, and the thickness of the cover layer of a digital versatile disc (DVD) is 0.6 mm.

Such a difference of thickness of the cover layer changes the relative position of the information layer with respect to a turntable, i.e., the distance between the optical pick-up and the information layer. Namely, the thicker the cover layer is, the greater the distance to the information layer from the optical pick-up is. For example, the optical pick-up is required to move a beam spot away from the optical pick-up by 0.6 mm in the cover layer, which is equivalent to 0.4 mm in air, when the DVD is replaced with a CD or a CD-R.

Although the position of a paraxial beam waist moves as the objective lens is moved, the change in the thickness of the cover layer changes a spherical aberration. If only the objective lens is moved in the optical pick-up when the disc is replaced with the different-thickness one, a wavefront aberration of the laser beam becomes large. For instance, when the objective lens, which is designed to minimize the spherical aberration for a DVD, is applied for reproducing the information from a CD, the spherical aberration becomes too large to reproduce the information even if the objective lens moves to place the beam spot on the information layer of the CD.

Further, the recording density of a DVD is higher than that of a CD, which requires the optical pick-up for a DVD to form a smaller beam spot than the optical pick-up designed for the exclusive use for a CD (hereinafter referred to as an exclusive CD pick-up). Since the diameter of the beam spot has a positive correlation with the wavelength of the laser beam, the optical pick-up for a DVD requires the laser source whose emission wavelength is 635 through 660 nm that is shorter than the emission wavelength of an exclusive CD pick-up (i.e., 780 through 830 nm). On the other hand, the reflection characteristics of a CD-R require the laser source whose emission wavelength is longer than 780 nm.

Accordingly, at least two laser sources are required for the optical pick-up to use a DVD and a CD-R.

It has been known as a prior art to form a diffractive lens structure on a surface of an objective lens to compensate a change of a spherical aberration. The diffractive lens structure has such a wavelength dependence that both of a spherical aberration at a short wavelength with a DVD and a spherical aberration at a long wavelength with a CD-R are corrected.

However, since the diffractive lens structure has the wavelength dependence, a wavefront aberration becomes large when the emission wavelength of the semiconductor laser becomes different from a design wavelength due to temperature change or to individual differences of semiconductor lasers. Such a wavefront aberration causes no problem for an optical disc having low recording density such as a CD or a CD-R, while it may interfere with the recording/reproducing of information data on/from an optical disc having high recording density such as a DVD because of low tolerance of wavefront aberration.

SUMMARY OF THE INVENTION

It is therefore an object of the present invention to provide an objective lens for an optical pick-up, which has a diffractive lens structure for correcting spherical aberrations in a plurality of kinds of optical discs having cover layers of different thickness, that is able to form a beam spot that has an appropriate size for respective optical discs even if the emission wavelength of a laser source becomes different from a design wavelength due to temperature change or to individual differences of the laser sources.

For the above object, according to the present invention, there is provided an improved objective lens for an optical pick-up which includes a refractive lens, and a diffractive lens structure having a plurality of concentric ring areas having minute steps at the boundaries therebetween and is formed on at least one lens surface of the refractive lens. The lens surface is divided into a high NA exclusive area through which a light beam of a high NA, which is necessary only for an optical disc having first recording density, passes, and a common area through which a light beam of a low NA, which is necessary and sufficient for an optical disc having low recording density, passes. The light beam of the high NA has a short wavelength and the light beam of the low NA has a long wavelength. The diffractive lens structure formed in the common area has a wavelength dependence of a spherical aberration, i.e., changes a spherical aberration thereof with a wavelength, such that the light beam of the short wavelength forms an appropriate wavefront for a thin cover type optical disc and the light beam of the long wavelength forms an appropriate wavefront for a thick cover type optical disc. On the other hand, the diffractive lens structure formed in the high NA exclusive area has a smaller wavelength dependence of a spherical aberration than that formed in the common area, and is designed such that a spherical aberration for the thin cover type optical disc at the short wavelength is adequately corrected.

With this construction, when the thin cover type optical disc is applied, the laser beams at the short wavelength passing through both of the common area and the high NA exclusive area are converged onto the information layer of the thin cover type optical disc because the diffractive lens structure adequately corrects a spherical aberration. On the other hand, when the thick cover type optical disc is applied, while the laser beam at the long wavelength passing through the common area is converged onto the information layer of the thick cover type optical disc because the diffractive lens structure in the area corrects the spherical aberration, the laser beam of the long wavelength passing through the high NA exclusive area is diffused because the diffractive lens structure in the high NA exclusive area does not adequately correct a spherical aberration at the long wavelength.

An additional optical path length added by the diffractive lens structure formed in the common area is expressed by the following optical path difference function $\Phi_C(h)$:

$$\Phi_C(h) = (P_{2C}h^2 + P_{4C}h^4 + P_{6C}h^6 + \ldots) \times m \times \lambda$$

where $P_{2C}$, $P_{4C}$ and $P_{6C}$ are coefficients of second, fourth and sixth orders, h is a height from the optical axis, m is a diffraction order and $\lambda$ is a working wavelength. Further, an additional optical path length added by the diffractive lens structure formed in the high NA exclusive area is expressed by the following optical path difference function $\Phi_E(h)$:

$$\Phi_E(h)=(P_{2E}h^2+P_{4E}h^4+P_{6E}h^6+\ldots)\times m\times\lambda$$

where $P_{2E}$, $P_{4E}$ and $P_{6E}$ are coefficients of second, fourth and sixth orders. In such an expression, negative values of the second order coefficients $P_{2C}$, $P_{2E}$ represent positive paraxial powers of the diffractive lens structure. Further, when the fourth order coefficients $P_{4C}$, $P_{4E}$ are smaller than zero, the positive power increases with the distance from the optical axis, which presents an undercorrected spherical aberration.

It is preferable that the diffractive lens structure satisfies the following conditions (1) and (2);

$$P_{2C}>P_{2E} \quad (1)$$

$$P_{4C}<P_{4E}, P_{4C}<0. \quad (2)$$

Further, the width of the innermost ring area of the high NA exclusive area may be larger than the width of the outermost ring area of the common area.

Still further, when the refractive lens is made of plastic, the diffractive lens structure preferably satisfies the condition (3):

$$P_{4C}<P_{4E}<0. \quad (3)$$

In particular, it is preferable that the diffractive lens structure formed in the high NA exclusive area has such a wavelength dependence that a change of a spherical aberration due to a variation of the refractive index of the refractive lens with a temperature change is compensated by a variation of emission wavelength of a semiconductor laser with the temperature change.

Incidentally, when the diffractive lens structure has the above described functions, an inner edge of a ring area is protruded with respect to an outer edge of the adjacent inner ring area in every pair of the inner and outer ring areas within the common area and the high NA exclusive area. Further, when the optical path difference function $\Phi_E(h)$ of the high NA exclusive area is determined to make the absolute value of $P_{4E}$ small and the absolute value of $P_{2E}$ large while keeping the continuity of the optical path difference function $\Phi_C(h)$ of the common area, the outer edge of the outermost ring area of the common area is protruded with respect to the inner edge of the innermost ring area of the high NA exclusive area.

However, when the orientation of the minute step at the boundary between the common and high NA exclusive area is opposite to that at the other boundaries, the diffractive lens structure is hard to manufacture. Therefore, it is preferable that the innermost ring area is formed as an extra-wide ring area where the difference between the values of the optical path difference function $\Phi_E(h)$ at the inner edge and that at the outer edge is larger than one wavelength long. In this case, the orientations of the minute steps at all of boundaries become identical.

DESCRIPTION OF THE ACCOMPANYING DRAWINGS

FIGS. 6A and 6B are graphs showing spherical aberrations of the optical system that employs the objective lens of the first embodiment, when a thin cover type optical disc is applied at a standard temperature;

FIG. 7 is a graph showing wavefront aberrations of the optical system that employs the objective lens of the first embodiment when the thin cover type optical disc is applied at the standard temperature;

FIGS. 9A and 9B are graphs showing spherical aberrations of the optical system that employs the objective lens of the first embodiment, when a thin cover type optical disc is applied at the temperature that is higher than the standard temperature by 40 degrees;

FIG. 10 is a graph showing a wavefront aberration of the optical system that employs the objective lens of the first embodiment when the thin cover type optical disc is applied at the temperature that is higher than the standard temperature by 40 degrees;

Figure 22A:
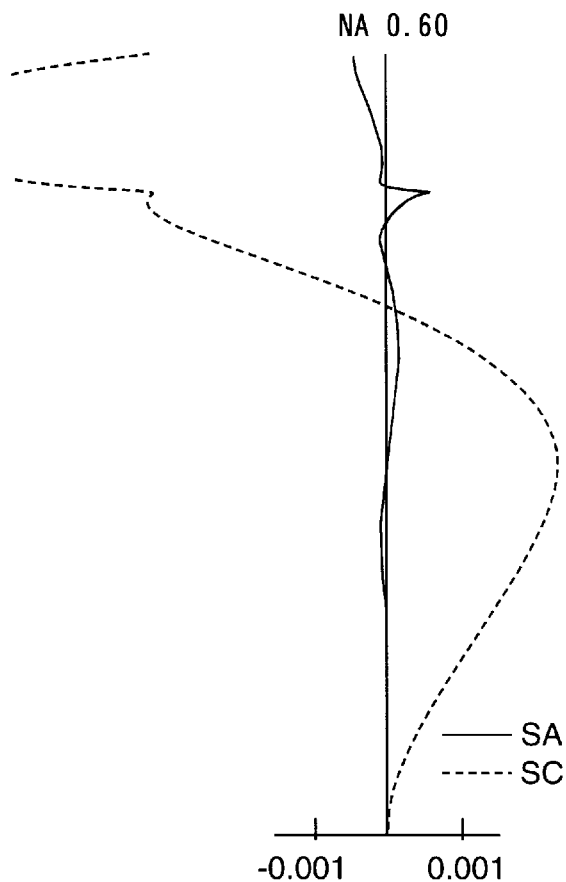
Figure 22B:
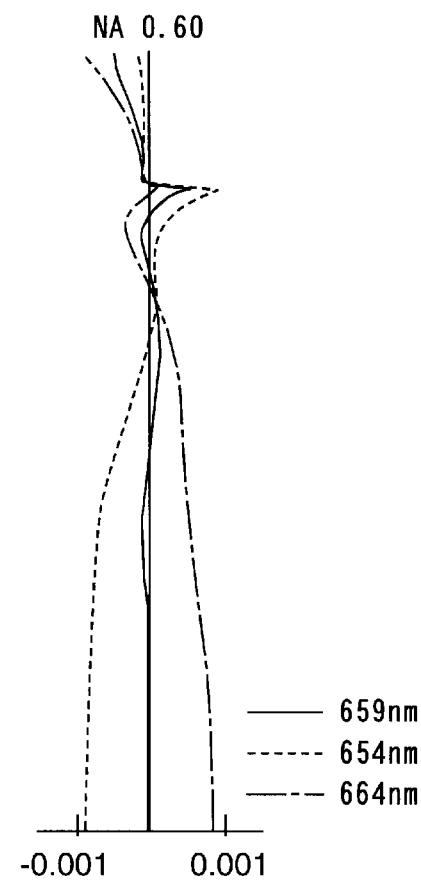
Figure 23:
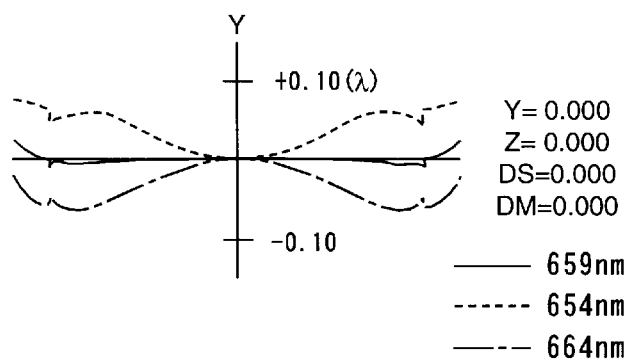

FIGS. 22A and 22B are graphs showing spherical aberrations of the optical system that employs the objective lens of the second embodiment when a thin cover type optical disc is applied at a standard temperature; and FIG. 23 is a graph showing a wavefront aberration of the optical system that employs the objective lens of the second embodiment when the thin cover type optical disc is applied at the standard temperature.

DESCRIPTION OF THE EMBODIMENTS

Figure 1A:
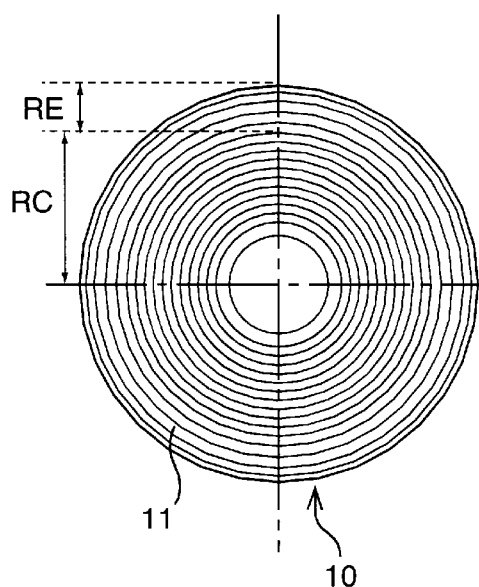
FIG. 1A is a front view of an objective lens of an optical pick-up embodying the invention.
Figures 1B, 1C:
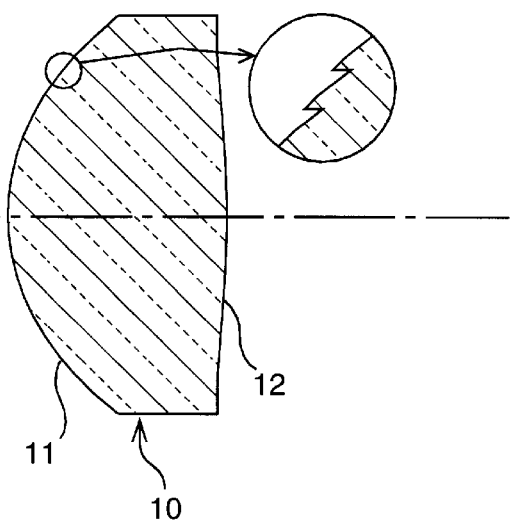
FIG. 1B is a vertical cross-sectional view of the objective lens of FIG. 1A.
FIG. 1C is an enlarged view of FIG. 1B.

FIGS. 1A, 1B and 1C show an objective lens 10 of an optical pick-up embodying the invention: FIG. 1A is a front view; FIG. 1B is a vertical cross-sectional view; and FIG. 1C is an enlarged view of FIG. 1B. The objective lens 10 is applied to an optical pick-up of an optical disc apparatus that is capable of recording/reproducing a plurality of kinds of optical discs (e.g., CD, CD-R and DVD). The objective lens 10 converges a laser beam emitted from a semiconductor laser onto an information layer of an optical disc.

The objective lens 10 is a biconvex plastic lens having first and second surfaces 11 and 12. A diffractive lens structure is formed on the first surface 11 of the objective lens 10 as shown in FIG. 1A. The diffractive lens structure is formed as a large number of concentric ring areas having minute steps in an optical axis direction at the boundaries therebetween, similar to a Fresnel lens, as shown in FIG. 1C. The second surface 12 is formed as a continuous surface without steps.

The lens surface of the objective lens 10 is divided into a high NA exclusive area RE through which a light beam of a high NA, which is necessary for an optical disc having high recording density such as a DVD only, passes, and a common area RC through which a light beam of a low NA, which is necessary and sufficient for an optical disc having low recording density such as a CD or a CD-R, passes. The diffractive lens structure is formed over the entire area including the common area RC and the high NA exclusive area RE. The common area RC is inside of the circle where a light beam whose NA is 0.45 through 0.50 passes, and the high NA exclusive area RE surrounds the common area RC.

Figure 2:
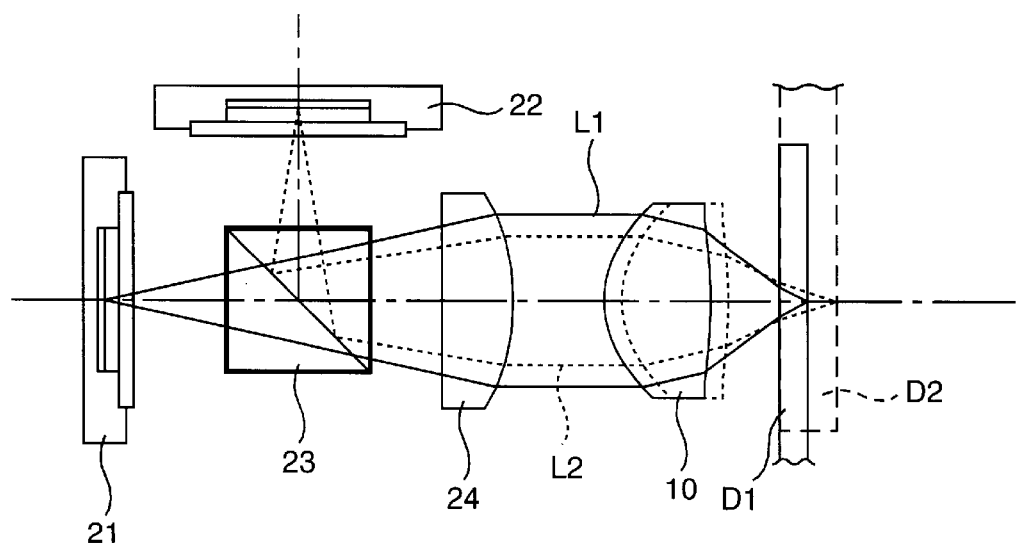
FIG. 2 shows an optical system of the optical pick-up that employs the objective lens of FIG. 1A.

FIG. 2 shows an optical system of the optical pick-up that employs the objective lens 10 embodying the invention. The optical system of the optical pick-up includes a DVD module 21, a CD module 22, a beam combiner 23, a collimator lens 24 and the objective lens 10. Each of the modules 21 and 22 is provided with a semiconductor laser and a sensor that are mounted on a common substrate. The objective lens 10 is driven in the optical axis direction and in the radial direction of the optical disc by means of well-known focusing and tracking mechanisms.

The DVD is a thin cover type optical disc that has higher recording density and the thickness of the cover layer thereof is 0.6 mm. In order to form a fine beam spot on the DVD, a laser beam whose wavelength is within a range of 635 nm through 665 nm is required. On the other hand, the CD-R and the CD are thick cover type optical discs that have lower recording density. The thickness of the cover layer of the CD-R or the CD is 1.2 mm. The CD-R requires near-infrared radiation due to its spectral reflectance.

Therefore, a semiconductor laser of the DVD module 21 emits the laser beam at wavelength of 656 nm or 659 nm, a semiconductor laser of the CD module 22 emits the laser beam at wavelength of 790 nm.

When the thin cover type optical disc $D_1$ having the thin cover layer is applied, the DVD module 21 is operated to emit the laser beam $L_1$ (shown by a solid line). The objective lens 10 is located at the position shown by a solid line. The laser beam $L_1$ is converged onto the information layer of the thin cover type optical disc $D_1$ through the thin cover layer.

When the thick cover type optical disc $D_2$ having the thick cover layer is applied, the CD module 22 is operated to emit the laser beam $L_2$ (shown by a dotted line). The objective lens 10 is moved close to the optical disc as shown by a dotted line to follow the displacement of the information layer. The laser beam $L_2$ is converged onto the information layer of the thick cover type optical disc $D_2$ through the thick cover layer.

The reflected laser beam from each of the optical discs is received by photodetectors provided in each of the modules. A focusing error signal and a tracking error signal are produced by the output from the photodetectors. Further, a reproducing signal of recorded information is also produced during reproducing.

Next, the construction of the diffractive lens structure formed on the first surface 11 of the objective lens 10 will be described.

The diffractive lens structure functions such that a predetermined order, a first order in the embodiment, diffraction light at a short wavelength (656 nm or 659 nm) forms an appropriate wavefront for the thin cover type optical disc $D_1$ and the same order diffraction light at a long wavelength (790 nm) forms an appropriate wavefront for the thick cover type optical disc $D_2$.

In the common area RC, the diffractive lens structure has a wavelength dependence of a spherical aberration such that a change of spherical aberration due to a change of thickness of the cover layer is compensated by a change of the wavelength of the incident beam. Namely, the diffractive lens structure in the common area RC has such a wavelength dependence that the spherical aberration varies in the under-corrected direction as the wavelength increases.

The spherical aberration varies in the overcorrected direction as the thickness of the cover layer increases. Further, the diffractive lens structure in the common area RC changes the spherical aberration in the undercorrected direction as the wavelength of the incident laser beam increases. And thus, since a longer wavelength laser beam is used for the thick cover type optical disc $D_2$ and a shorter wavelength light beam is used for the thin cover type optical disc $D_1$, the change of the spherical aberration due to a change of the cover layer's thickness is counterbalanced by the change of the spherical aberration due to the wavelength dependence of the diffractive lens structure.

The diffractive lens structure formed in the high NA exclusive area RE has a smaller wavelength dependence of a spherical aberration than that formed in the common area RC, and is designed such that a spherical aberration at the short wavelength (656 nm or 659 nm) is adequately corrected for the thin cover type optical disc $D_1$.

With this construction, when the thin cover type optical disc $D_1$ is applied, the laser beams at wavelength of 656 nm or 659 nm passing through both of the common area RC and the high NA exclusive area RE is converged onto the information layer of the thin cover type optical disc $D_1$ because the diffractive lens structures of both of the areas RC and RE adequately correct spherical aberration. Since the effective NA is high and the wavelength is short, the small beam spot, which is suitable for the thin cover type optical disc $D_1$ having high recording density, is formed.

On the other hand, when the thick cover type optical disc $D_2$ is applied, the laser beam at the wavelength of 790 nm passing through the common area RC is converged onto the information layer of the thick cover type optical disc $D_2$ because the diffractive lens structure in the area RC corrects the spherical aberration. The laser beam of 790 nm passing through the high NA exclusive area RE is diffused over a doughnut-shaped area around and apart from the beam spot because the diffractive lens structure in the area RE does not correct spherical aberration adequately at 790 nm. Since the effective NA is low and the wavelength is long, the large beam spot, which is suitable for the thick cover type optical disc having low recording density, is formed.

When the lens surface is divided into the common area and the high NA exclusive area as described above, there are the following three design methods to design the diffractive lens structure.
(a) The diffractive lens structures in both of the common area RC and the high NA exclusive area RE are defined by the common optical path difference function, while the blaze wavelengths are different to each other.
(b) The diffractive lens structure is formed in the common area RC only, and the high NA exclusive area RE is formed as a continuous a spherical surface without steps that is optimized for the thin cover type optical disc $D_1$.
(c) The diffractive lens structures in the common area RC and the high NA exclusive area RE are defined by the different optical path difference functions. The wavelength dependence of the spherical aberration of the diffractive lens structure in the high NA exclusive area RE is smaller than that of the diffractive lens structure in the common area RC. This is the present invention.

In the design method (a), the blaze wavelength in the common area RC is determined between the emission wavelengths of two semiconductor lasers, and the blaze wavelength in the high NA exclusive area RE is determined near the short wavelength. For example, assuming that the emission wavelength of the laser source for the thin cover type optical disc $D_1$ is 660 nm and that for the thick cover type optical disc $D_2$ is 780 nm, the blaze wavelength in the common area RC is 720 nm and the blaze wavelength in the high NA exclusive area RE is 660 nm. In this design method, when the thick cover type optical disc D2 is applied, the laser beam at wavelength of 780 nm passing through the high NA exclusive area RE is converged together with the laser beam passing through the common area. Therefore, when aberration is corrected, the NA of the laser beam becomes large for the thick cover type optical disc $D_2$, which makes the beam spot becomes too small to reproduce the recorded information. On the other hand, when aberration remains, the beam spot becomes large to cover adjacent tracks, which causes noise (so-called "jitter").

Therefore, when the design method (a) is adapted, an aperture mechanism is required to cut off the incident beam onto the high NA exclusive area when the thick cover type optical disc $D_2$ is applied.

Further, since the objective lens designed based on the design method (a) has a high sensitivity of a spherical aberration to wavelength over the entire area of the lens surface, the wavefront aberration remarkably increases with a slight change of wavelength. Such a wavefront aberration causes no problem for the thick cover type optical disc $D_2$ having low recording density, while it becomes a problem for the thin cover type optical disc D1 because of low tolerance of a wavefront aberration. Therefore, the design method (a) narrows tolerance of emission wavelength of the semiconductor laser for the thin cover type optical disc $D_1$.

In the design method (b), since the high NA exclusive area generates a longitudinal chromatic aberration and has no wavelength dependence of a spherical aberration, the laser beam of the short wavelength for the thin cover type optical disc $D_1$ passing through the high NA exclusive area is converged to form a beam spot together with the laser beam passing through the common area, while the laser beam at the long wavelength for the thick cover type optical disc $D_2$ passing through the high NA exclusive area is diffused over a doughnut-shaped area around and apart from the beam spot formed by the laser beam passing through the common area.

However, in the design method (b), since the diffractive lens structure, which changes the spherical aberration with the change of wavelength, is formed in the common area and the high NA exclusive area is formed as the continuous surface without steps, the wavefront of the laser beam passing through the high NA exclusive area has no continuity with the wavefront of the laser beam passing through the common area even when the thin cover type optical disc $D_1$ is applied. Therefore, the wavefront aberration remarkably increases with a slight change of wavelength. The design method (b) also narrows tolerance of emission wavelength of the semiconductor laser for the thin cover type optical disc $D_1$.

Therefore, the present invention adopts the design method (c). Namely, the wavelength dependence of the spherical aberration of the diffractive lens structure in the high NA exclusive area RE is kept small to reduce the wavefront aberration caused by the change of wavelength when the thin cover type optical disc $D_1$ is applied, while keeping the continuity of a wavefront between the common area and the high NA exclusive area by forming the diffractive lens structure over the entire area.

Further, the diffractive lens structure in the high NA exclusive area has such a wavelength dependence that a change of a spherical aberration due to a variation of the refractive index of the refractive lens with a temperature change is compensated by a variation of emission wavelength of a semiconductor laser with a temperature change. Since a plastic lens has a higher temperature sensitivity to a refractive index and a shape than a glass lens, a change of the performance due to a temperature change is likely to become a problem. For instance, when a temperature rises, a refractive index of a plastic lens decreases, which changes the spherical aberration in the overcorrected direction, causing the wavefront aberration. In a plastic lens, the ratio of the change of the refractive index to the temperature change is substantially equal to −10×10⁻⁵/degree. On the other hand, an emission wavelength of a semiconductor laser becomes longer as temperature rises. The emission wavelength changes by +8 nm when the temperature rises by 40 degrees.

Thus, when the diffractive lens structure in the high NA exclusive area RE has such a wavelength dependence that the spherical aberration varies in the undercorrected direction as the wavelength of the incident beam increases, the change of the spherical aberration in the overcorrected direction of the refractive lens due to temperature-rise can be counterbalanced by the change of the spherical aberration in the undercorrected direction of the diffractive lens structure due to the increasing of the wavelength of the semiconductor laser by temperature-rise.

An additional optical path length added by the diffractive lens structure formed in the common area RC is expressed by the following optical path difference function $\Phi_C(h)$:

$$\Phi_C(h)=(P_{2C}h^2+P_{4C}h^4+P_{6C}h^6+\ldots)\times m\times\lambda$$

where $P_{2C}$, $P_{4C}$ and $P_{6C}$ are coefficients of second, fourth and sixth orders, h is a height from the optical axis, m is a diffraction order and $\lambda$ is a working wavelength. Further, an additional optical path length added by the diffractive lens structure formed in the high NA exclusive area RE is expressed by the following optical path difference function $\Phi_E(h)$:

$$\Phi_E(h)=(P_{2E}h^2+P_{4E}h^4+P_{6E}h^6+\ldots)\times m\times\lambda$$

where $P_{2E}$, $P_{4E}$ and $P_{6E}$ are coefficients of second, fourth and sixth orders. In such an expression, negative values of the second order coefficients $P_{2C}$, $P_{2E}$ represent positive paraxial powers of the diffractive lens structure. Further, when the fourth order coefficients $P_{4C}$, $P_{4E}$ are smaller than zero, the positive power increases with the distance from the optical axis, which presents an undercorrected spherical aberration.

An actual microscopic shape of the diffractive lens structure is defined by subtracting $\lambda\times m$ (m:integer) from $\Phi(h)$ to have the stepwise additional optical path length as with the Fresnel lens. The width of the ring area is determined such that the difference between the optical path difference function $\Phi(h)$ at the inner edge of the ring area and that at the outer edge of the same ring area is equal to one wavelength long. Further, the distance of the minute step between the adjacent ring areas in the optical axis direction is determined such that the optical path difference between the light ray passing through one of the ring areas and the light ray passing through the other ring area becomes equal to one wavelength long.

The diffractive lens structure satisfies the following conditions (1) and (2);

$$P_{2C}>P_{2E} \tag{1}$$

$$P_{4C}<P_{4E}, P_{4C}<0. \tag{2}$$

It is known that a value corresponding to Abbe number for a diffractive lens structure is equal to −3.453. The diffractive lens structure having a positive power can compensate the longitudinal chromatic aberration of the refractive lens having a positive power. In order to give a positive power to the diffractive lens structure, the second order coefficient of the optical path difference function should be negative. On the other hand, when the fourth order coefficient is negative, the diffractive lens structure has such a wavelength dependence that the spherical aberration varies in the undercorrected direction as the wavelength increases.

In the common area RC, since a principal function of the diffractive lens structure is to change the spherical aberration with wavelength, the absolute value of the fourth order coefficient should be large, while the absolute value of the second order coefficient is set to be small. On the contrary, in the high NA exclusive area, since the diffractive lens structure may have a small wavelength dependence of a spherical aberration that is enough to compensate the change of the spherical aberration due to a temperature change, the fourth order coefficient should be negative and the absolute value thereof is relatively small. Further, in the high NA exclusive area RE, the absolute value of the second order coefficient becomes relatively large to reduce the variation of the spherical aberration due to a temperature change while keeping the continuity of the wavefront with that of the common area RC in spite of a wavelength change. As a result, the second and fourth order coefficients should satisfy the conditions (1) and (2).

Figure 3A:
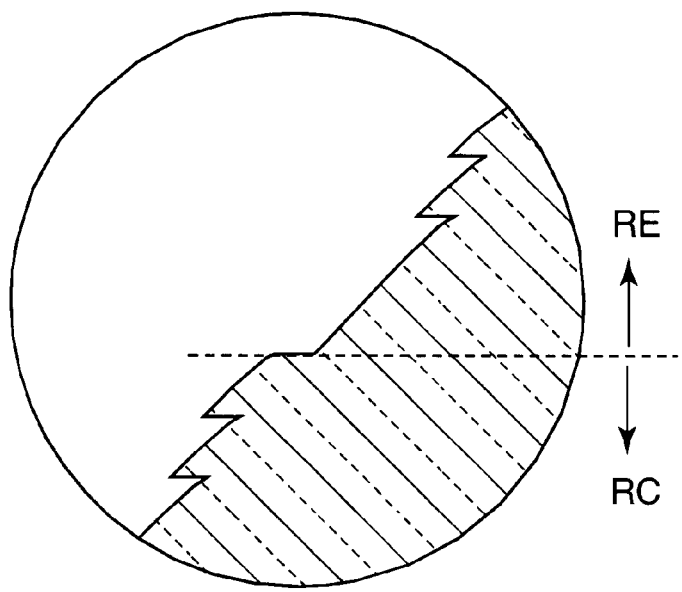
FIGS. 3A and 3B are enlarged sectional views of the boundary portions between a common area and a high NA exclusive area of the objective lens embodying the invention.
Figure 3B:
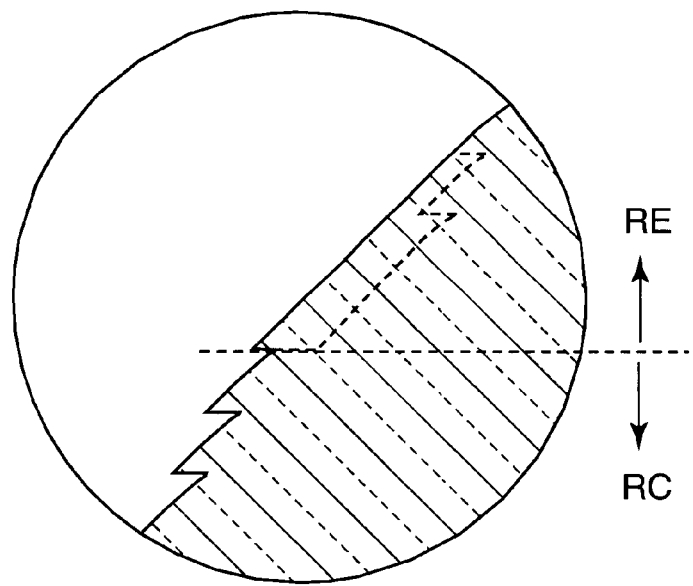

Next, the microscopic construction of the diffractive lens structure will be described. FIGS. 3A and 3B are enlarged sectional views showing the boundary portion between the common area RC and the high NA exclusive area RE. The diffractive lens structure is formed such that an inner edge of a ring area is protruded with respect to the outer edge of the adjacent inner ring area in every pair of the inner and outer ring areas within the common area RC and the high NA exclusive area RE.

Further, when the optical path difference function $\Phi_E(h)$ in the high NA exclusive area RE is determined such that the absolute value of the fourth order coefficient becomes small and the absolute value of the second order coefficient becomes large while keeping the continuity with the optical path difference function $\Phi_C(h)$ in the common area RC, the width of the innermost ring area in the high NA exclusive area RE becomes larger than the width of the outermost ring area in the common area RC, and the outer edge of the outermost ring area of the common area RC is protruded with respect to the inner edge of the innermost ring area of the high NA exclusive RE area as shown in FIG. 3A.

When the diffractive lens structure like a Fresnel lens is formed on the aspherical surface of the refractive lens, the mechanical method with a precision lathe is suitable rather than the lithography method to form the structure. According to the mechanical method, the pattern of the diffractive lens structure is formed on a molding surface of a die by a cutting tool with the precision lathe, and then, the pattern is transferred to an injection molded replica. This replica becomes an objective lens.

However, when the orientation of the minute step at the boundary between the common area RC and the high NA exclusive area RE is opposite to that at the other boundaries, a portion corresponding to the outermost ring area in the common area RC on the molding surface of the die is formed as a recess, and the edge thereof may not be formed by the cutting tool.

The inner three ring areas of the high NA exclusive area RE may be formed as a single ring area as shown in FIG. 3B. Namely, the third ring area of the high NA exclusive area may be extended to the boundary by filling the inner two ring areas. In such a construction, since the orientations of the minute steps at all of boundaries are identical, it becomes easy to form the molding surface of the die. When the third ring area is extended, the innermost ring area in the high NA exclusive area RE is formed as an extra-wide ring area where the difference between the values of the optical path difference function $\Phi_E(h)$ at the inner edge and that at the outer edge is larger than one wavelength long. When the diffractive lens structure has such an extra-wide area, it is equivalent to use a higher order diffraction beam such as a second or third order in the extra-wide area. Therefore, there is no problem when the working wavelength is equal to the blaze wavelength, while the difference between the working wavelength and the blaze wavelength causes a drop in a diffraction efficiency. However, since the extra-wide ring area is included in the high NA exclusive area RE where the difference between the working wavelength and the blaze wavelength is small, and the area ratio of the extra-wide ring area in the entire lens surface is minimal, the drop of the diffraction efficiency causes no problem in practical use.

Two embodiments according to the above mentioned construction will be described hereinafter. The objective lenses of the embodiments are designed for a compatible optical pick-up that can use the thin cover type optical disc $D_1$ having the cover layer of 0.6 mm and the thick cover type optical disc $D_2$ having the cover layer of 1.2 mm. The objective lens 10 is provided with the diffractive lens structure on the first surface 11 and converges the first order diffraction beam onto the information layer of the optical disc.

First Embodiment

TABLE 1 shows data of the objective lens 10 of the first embodiment. The common area RC satisfies $0 \leq h < 1.69$ and the high NA exclusive area RE satisfies $1.69 \leq h < 2.02$ (unit:mm). The diffractive lens structure is formed in both of the common area RC and the high NA exclusive area RE of the first surface 11. The diffractive lens structure formed within the common area RC is defined by the different optical path difference function from that for the high NA exclusive area RE. Additionally, a base curve, which is the shape of the surface of the refractive lens when the diffractive lens structure is not formed, of the common area RC is an aspherical surface that is different from the aspherical base curve of the high NA exclusive area. The second surface 12 is a continuous a spherical surface without steps.

The base curve of the common area and the high NA exclusive area of the first surface 11, and the second surface 12 are rotationally-symmetrical aspherical surfaces. A rotationally-symmetrical aspherical surface is expressed by the following equation:

$$X(h) = \frac{h^2 c}{1 + \sqrt{1 - (1+\kappa)h^2 c^2}} + A_4 h^4 + A_6 h^6 + A_8 h^8 + A_{10} h^{10} + A_{12} h^{12}$$

$X(h)$ is a sag, that is, a distance of a curve from a tangential plane at a point on the surface where the height from the optical axis is h. Symbol c is a curvature (1/r) of the vertex of the surface, $\kappa$ is a conic constant, $A_4$, $A_6$, $A_8$, $A_{10}$ and $A_{12}$ are aspherical surface coefficients of fourth, sixth, eighth, tenth and twelfth orders, respectively.

TABLE 1 shows the various coefficients that define the base curve and the diffractive lens structure of the common area RC of the first surface 11, the various coefficients that define the base curve and the diffractive lens structure of the high NA exclusive area RE of the first surface 11, the various coefficients that define the second surface 12, distance along the optical axis between the surfaces d, refractive indices n659, n790 at the working wavelengths 659 nm, 790 nm. In TABLE 1, $NA_1$, $f_1$ and $\lambda_1$ denote a numerical aperture, a focal length (unit:mm) and a working wavelength (unit:nm) for the thin cover type optical disc $D_1$, $NA_2$, $f_2$ and $\lambda_2$ denote a numerical aperture, a focal length (unit:mm) and a working wavelength for the thick cover type optical disc $D_2$, respectively. Further, r denotes a radius of curvature of a paraxial portion, $\lambda_B$ denotes the blaze wavelength and ds denotes a distance of the minute step between the adjacent ring areas in the optical axis direction.

TABLE 1

| | $NA_1 = 0.60$ $f_1 = 3.360$ $\lambda_1 = 656$ nm | | |
| | $NA_2 = 0.50$ $f_2 = 3.384$ $\lambda_2 = 790$ nm | | |
| | First surface | | |
| | Common area ($0 \leq h < 1.69$) | High-NA exclusive area ($1.69 \leq h < 2.02$) | Second surface |
|---|---|---|---|
| r | 2.101 | 2.129 | −8.450 |
| κ | −0.500 | −0.500 | 0.0 |
| A4 | −1.81100 × 10⁻³ | −6.72000 × 10⁻⁴ | 1.60200 × 10⁻² |
| A6 | −2.44900 × 10⁻⁴ | −1.46200 × 10⁻⁵ | −3.26800 × 10⁻³ |
| A8 | −1.75000 × 10⁻⁵ | −8.69200 × 10⁻⁵ | 1.29900 × 10⁻⁴ |
| A10 | −3.51400 × 10⁻⁶ | 2.19000 × 10⁻⁵ | 3.20300 × 10⁻⁵ |
| A12 | −2.56000 × 10⁻⁶ | −5.36100 × 10⁻⁶ | −3.74500 × 10⁻⁶ |
| $P_{2C}, P_{2E}$ | 0.0 | −2.56044 | — |
| $P_{4C}, P_{4E}$ | −1.65300 | −0.80000 | — |
| $P_{6C}, P_{6E}$ | −0.15050 | −0.09000 | — |
| $P_{8C}, P_{8E}$ | 0.0 | 0.0 | — |
| $P_{10C}, P_{10E}$ | 0.0 | 0.0 | — |
| $P_{12C}, P_{12E}$ | 0.0 | 0.0 | — |
| $\lambda_B$ | 720 nm | 657 nm | — |
| ds | 1.3372 μm | 1.2154 μm | — |
| d | | | 2.210 |
| n656 | | | 1.54059 |
| n790 | | | 1.53653 |

Distances $h_{in}$, $h_{out}$ (unit:mm) to inner and outer edges from the optical axis of a ring area whose ring number is N and a width W (unit:mm) of this ring area are shown in TABLE 2. The ring number N is counted from the center to the periphery. The ring number of the center circular area is 0, that of the next outer ring area is 1, and the ring number of the outermost ring area is 30. The ring areas whose ring numbers are 0 through 16 are included in the common area RC and the ring areas whose ring numbers are 17 through 30 are included in the high NA exclusive

TABLE 2

| N | $h_{in}$ | $h_{out}$ | W | N | $h_{in}$ | $h_{out}$ | W |
|---|---|---|---|---|---|---|---|
| 0 | 0.000 | 0.733 | 0.733 | 16 | 1.655 | 1.690 | 0.035 |
| 1 | 0.733 | 0.957 | 0.224 | 17 | 1.690 | 1.738 | 0.048 |
| 2 | 0.957 | 1.081 | 0.124 | 18 | 1.738 | 1.766 | 0.028 |
| 3 | 1.081 | 1.171 | 0.090 | 19 | 1.766 | 1.793 | 0.027 |
| 4 | 1.171 | 1.243 | 0.072 | 20 | 1.793 | 1.819 | 0.026 |
| 5 | 1.243 | 1.303 | 0.060 | 21 | 1.819 | 1.844 | 0.025 |
| 6 | 1.303 | 1.355 | 0.052 | 22 | 1.844 | 1.868 | 0.024 |
| 7 | 1.355 | 1.401 | 0.046 | 23 | 1.868 | 1.891 | 0.023 |
| 8 | 1.401 | 1.442 | 0.041 | 24 | 1.891 | 1.913 | 0.022 |
| 9 | 1.442 | 1.480 | 0.038 | 25 | 1.913 | 1.934 | 0.021 |
| 10 | 1.480 | 1.514 | 0.034 | 26 | 1.934 | 1.955 | 0.021 |
| 11 | 1.514 | 1.546 | 0.032 | 27 | 1.955 | 1.975 | 0.020 |
| 12 | 1.546 | 1.576 | 0.030 | 28 | 1.975 | 1.994 | 0.019 |
| 13 | 1.576 | 1.604 | 0.028 | 29 | 1.994 | 2.013 | 0.019 |
| 14 | 1.604 | 1.630 | 0.026 | 30 | 2.013 | 2.031 | 0.018 |
| 15 | 1.630 | 1.655 | 0.025 | | | | |

Figure 4:
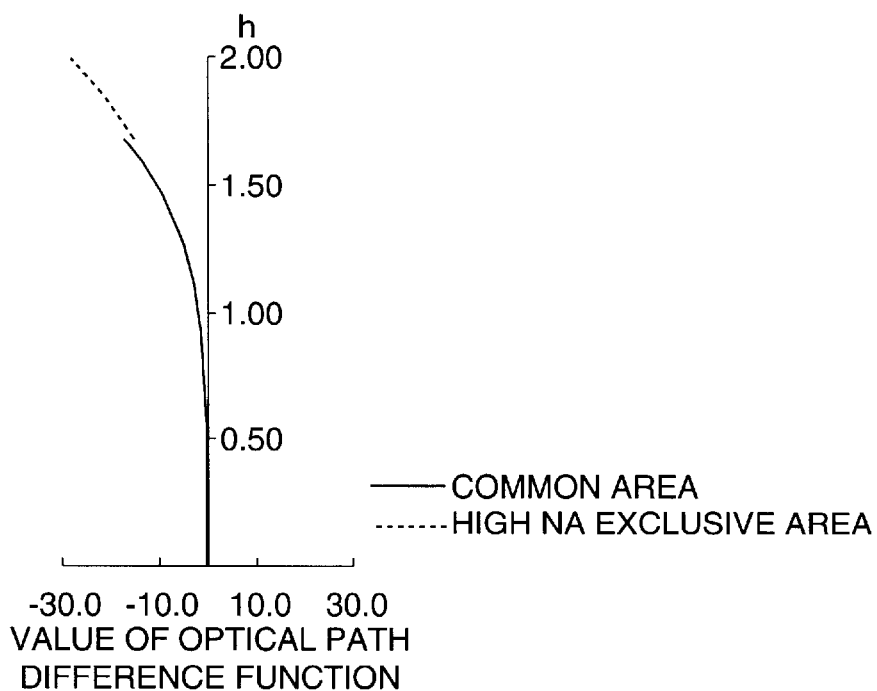
FIG. 4 is a graph showing values of the optical path difference function of a diffractive lens structure according to a first embodiment.
Figure 5:
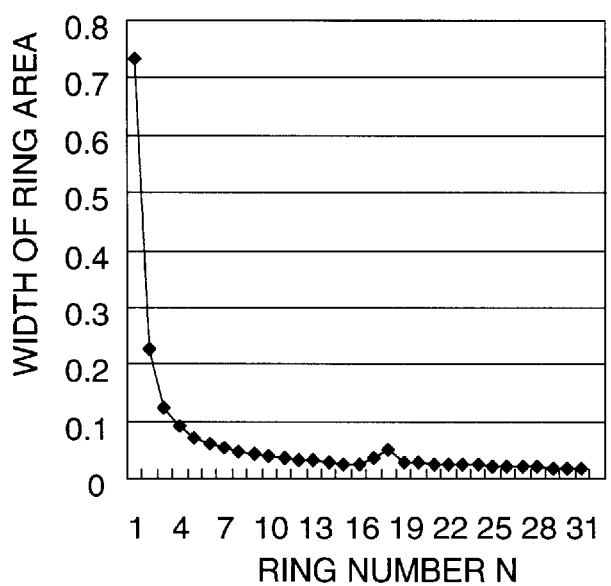
FIG. 5 is a graph showing a variation of a width of a ring area of the diffractive lens structure according to the first embodiment.

FIG. 4 is a graph showing values of the optical path difference function of a diffractive lens structure according to the first embodiment. In the graph, a solid line indicates the values in the common area RC and a dotted line indicates the values in the high NA exclusive area RE. The horizontal axis denotes the optical path difference and the vertical axis denotes the distance from the optical axis. Further, FIG. 5 is a graph showing a variation of the width W indicated in TABLE 2. Within each of the common area RC and the high NA exclusive area RE, the width W decreases with distance from the optical axis. That is, the width of the outer ring area is smaller than the adjacent inner ring area except 16th and 17th ring areas at the boundary between the areas RC and RE. Since the outer edge of the 16th ring area is determined by the NA required for the common area RC, the width thereof is larger than an original width that is determined by the optical path difference function $\Phi_C(h)$. The 17th ring area is the extra-wide area as shown in FIG. 3B to make the orientations of all of the minute steps identical.

Figure 8:
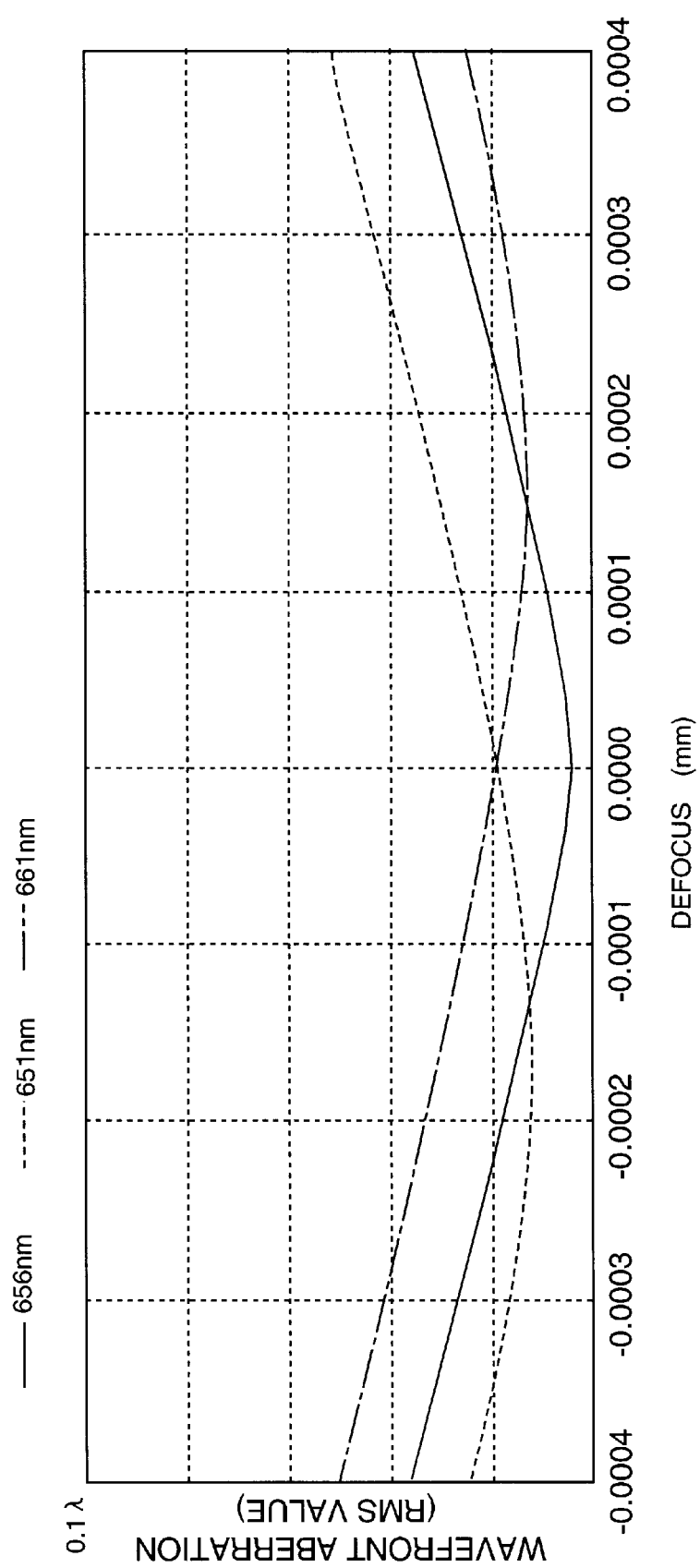
FIG. 8 is a graph showing a relationship between an rms (root-mean-square) value of the wavefront aberration and defocus in the optical system that employs the objective lens of the first embodiment when the thin cover type optical disc is applied at the standard temperature.

The performance of the objective lens 10 of the first embodiment will be described with reference to aberration diagrams of the optical system including the objective lens and the cover layer of the optical disc. FIGS. 6 through 8 show aberrations of the optical system when the thin cover type optical disc $D_1$ is applied at a standard temperature (25° C., for example), FIG. 6A shows a spherical aberration SA and sine condition SC at the working wavelength 656 nm; FIG. 6B shows spherical aberrations at 651 nm, 656 nm and 661 nm; FIG. 7 shows wavefront aberrations at 651 nm, 656 nm and 661 nm; and FIG. 8 shows a relationship between an rms (root-mean-square) value of the wavefront aberration and defocus at 651 nm, 656 nm and 661 nm.

As shown in FIG. 7, the wavefront of the laser beam passing through the common area RC has continuity with the wavefront of the laser beam passing through the high NA exclusive area RE. Further, as shown in FIG. 8, since the minimum wavefront aberration does not exceed $0.017\lambda$ even when the working wavelength varies by ±5 nm, the laser beam can be converged into adequately small beam spot at the best focus position.

Figure 11:
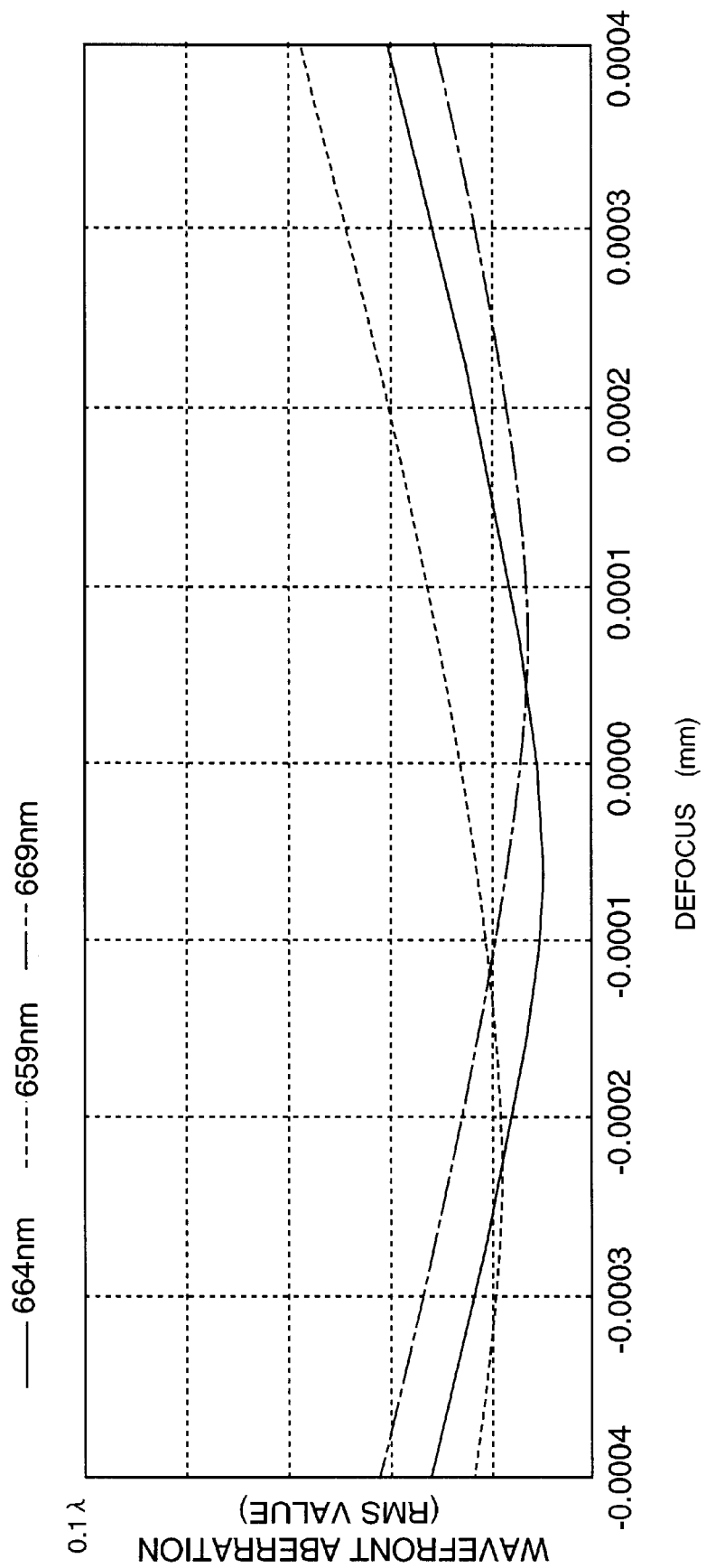
FIG. 11 is a graph showing a relationship between an rms value of the wavefront aberration and defocus in the optical system that employs the objective lens of the first embodiment when the thin cover type optical disc is applied at the temperature that is higher than the standard temperature by 40 degrees.

FIGS. 9 through 11 show aberrations of the optical system when the thin cover type optical disc $D_1$ is applied at a temperature that is higher than the standard temperature by 40 degrees, FIGS. 9A and 9B show spherical aberrations, FIG. 10 shows wavefront aberrations and FIG. 11 shows a relationship between the wavefront aberration and defocus. Since the temperature change by 40 degrees shifts the working wavelength of the semiconductor laser by ±8 nm, the aberrations in FIGS. 9B, 10 and 11 are evaluated at 659 nm, 664 nm and 669 nm. When the temperature rises by 40 degrees, the minimum wavefront aberration at a shifted wavelength 664 nm (656+8 nm) becomes $0.010\lambda$. The minimum wavefront aberration does not exceed $0.020\lambda$ even when the working wavelength varies by ±5 nm.

Figure 12A:
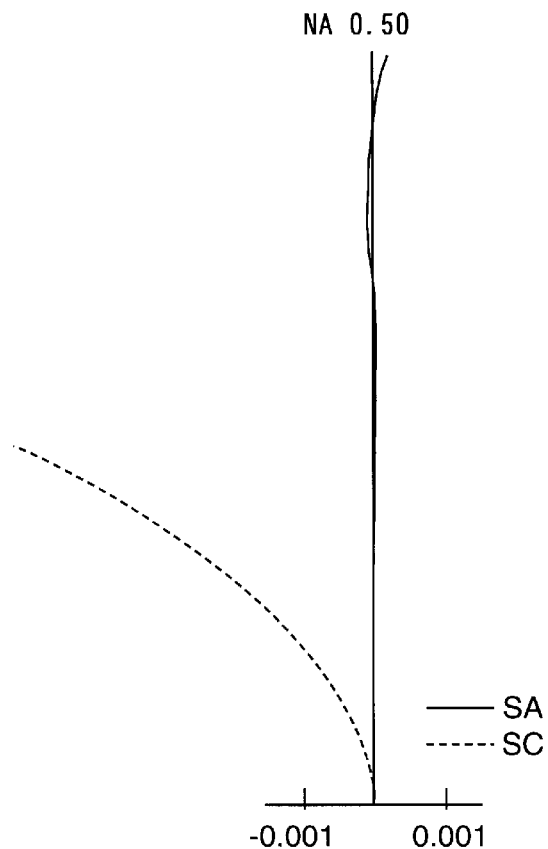
FIGS. 12A and 12B are graphs showing spherical aberrations of the optical system that employs the objective lens of the first embodiment when a thick cover type optical disc is applied at a standard temperature.
Figure 12B:
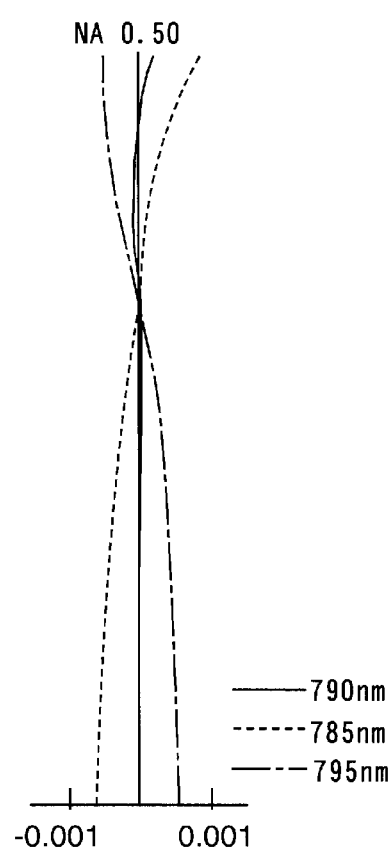
Figure 13:
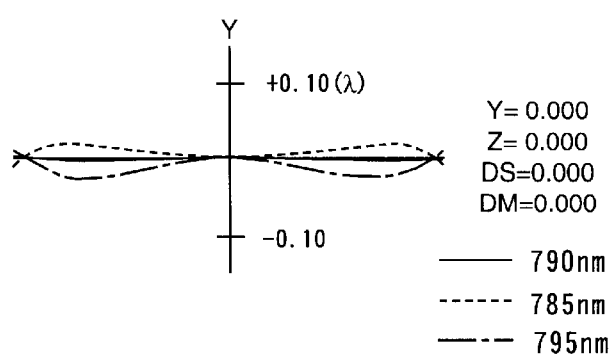
FIG. 13 is a graph showing a wavefront aberration of the optical system that employs the objective lens of the first embodiment when the thick cover type optical disc is applied at the standard temperature.
Figure 14:
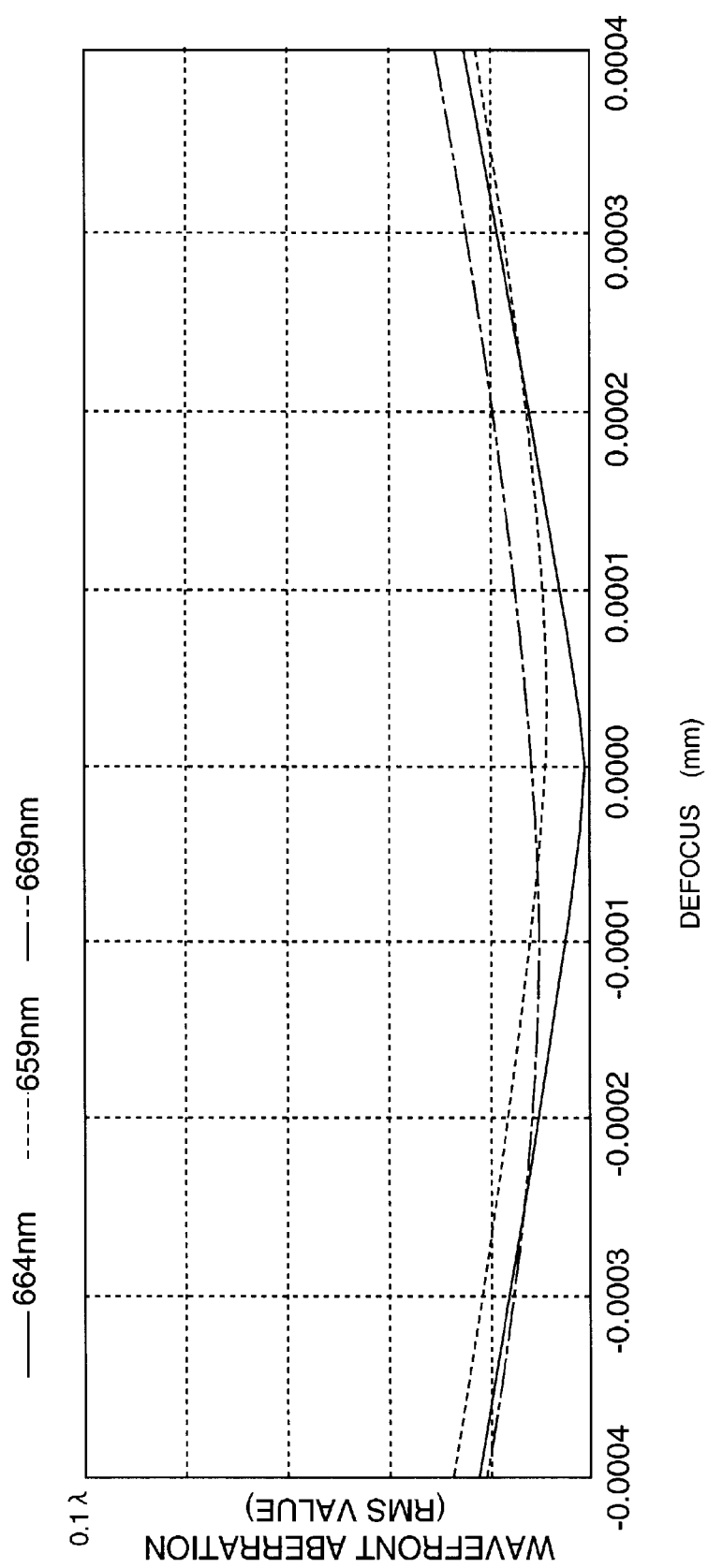
FIG. 14 is a graph showing a relationship between an rms value of the wavefront aberration and defocus in the optical system that employs the objective lens of the first embodiment when the thick cover type optical disc is applied at the standard temperature.

FIGS. 12 through 14 show aberrations of the optical system when the thick cover type optical disc $D_2$ is applied at the standard temperature, FIG. 12A shows a spherical aberration SA and sine condition SC at the working wavelength 790 nm; FIG. 12B shows spherical aberrations at 785 nm, 790 nm and 795 nm; FIG. 13 shows wavefront aberrations at 785 nm, 790 nm and 795 nm; and FIG. 14 shows a relationship between an rms value of the wavefront aberration and defocus at 785 nm, 790 nm and 795 nm. If FIG. 6A and FIG. 12A are compared, it is clear that the spherical aberrations are adequately corrected in both the wavelengths in spite of the difference of the cover layers in thickness.

Next, comparative examples that are designed by the above described design methods (a) and (b) will be described to show an advantage of the first embodiment that is designed by the design method (c).

Figure 15:
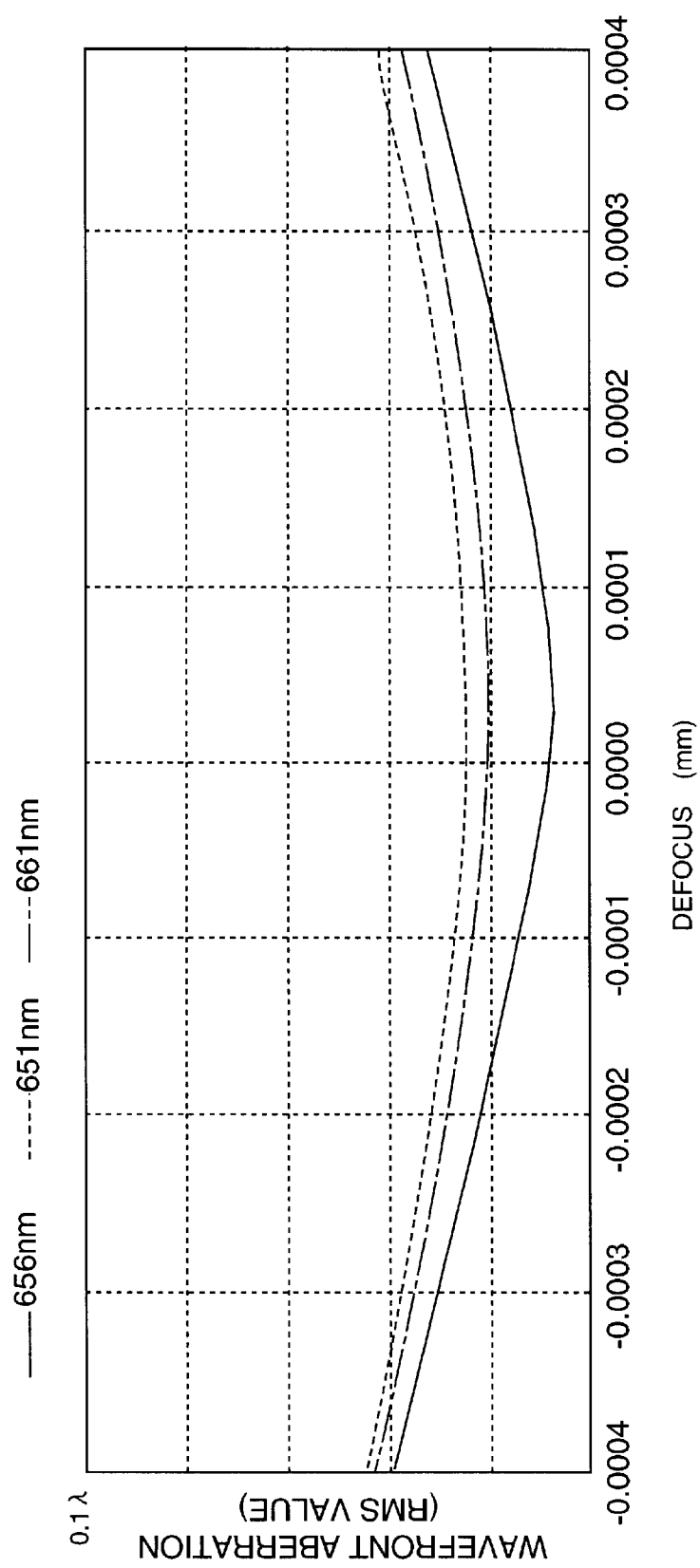
FIG. 15 is a graph showing a relationship between an rms value of the wavefront aberration and defocus in the optical system that employs the objective lens of a first compared example when the thin cover type optical disc is applied at the standard temperature.

FIG. 15 is a graph showing a relationship between an rms value of the wavefront aberration and defocus at 651 nm, 656 nm and 661 nm in the optical system that employs the objective lens of a first comparative example when the thin cover type optical disc $D_1$ is applied. The objective lens of the first comparative example is designed by the design method (a), i.e., the diffractive lens structure is defined by a single optical path difference function both in the common area RC and the high NA exclusive area RE, under the same specifications such as working wavelengths, NA, focal lengths or the like as the first embodiment. As shown in FIG. 15, since the minimum wavefront aberrations exceed $0.02\lambda$ when the working wavelength varies by ±5 nm, the laser beam may not be converged into adequately small beam spot due to an individual difference of an emission wavelength of a semiconductor laser.

FIGS. 16 through 19 show aberrations of the optical system that employs an objective lens of a second comparative example when the thin cover type optical disc $D_1$ is applied. The objective lens of the second comparative example is designed by the design method (b), i.e., the high NA exclusive area RE is formed as a continuous surface without steps, under the same specifications as the first embodiment.

Figure 16:
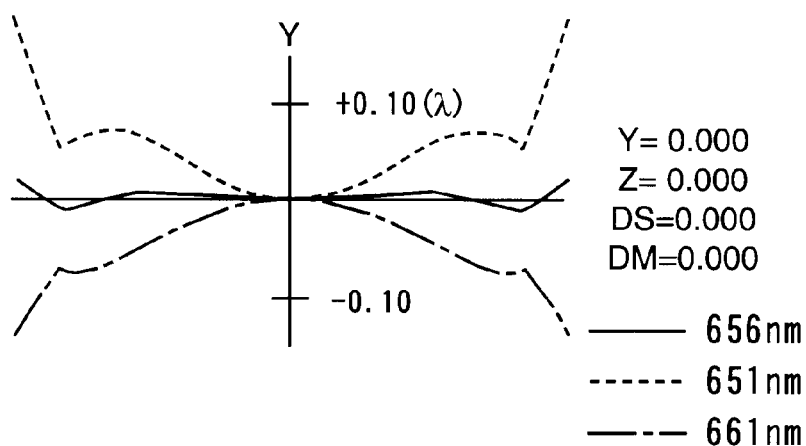
FIG. 16 is a graph showing a wavefront aberration of the optical system that employs the objective lens of a second compared example when the thin cover type optical disc is applied at the standard temperature.
Figure 17:
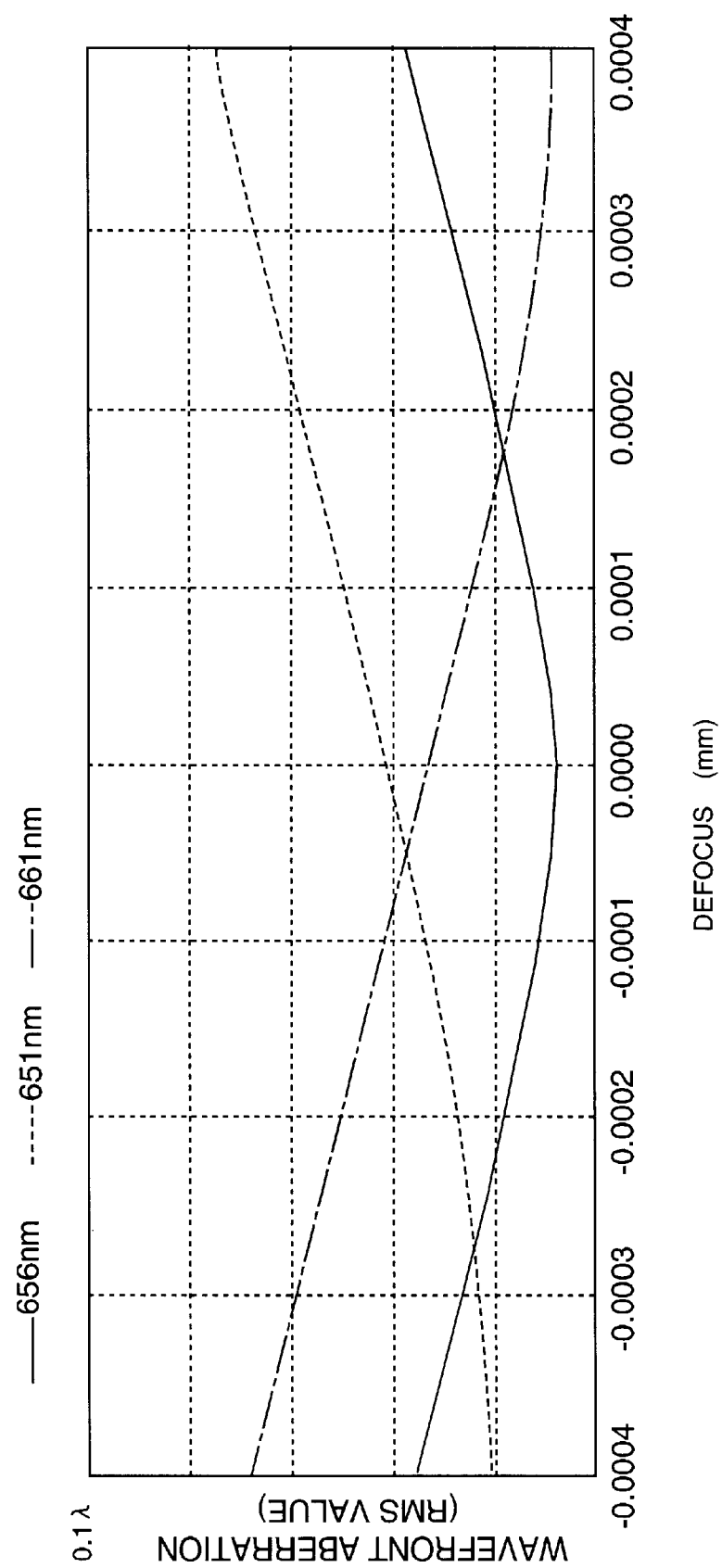
FIG. 17 is a graph showing a relationship between an rms value of the wavefront aberration and defocus in the optical system that employs the objective lens of the second compared example when the thin cover type optical disc is applied at the standard temperature.

FIGS. 16 and 17 show the aberrations at the standard temperature, FIG. 16 shows a wavefront aberration at 651 nm, 656 nm and 661 nm; FIG. 17 shows a relationship between an rms value of the wavefront aberration and defocus at 651 nm, 656 nm and 661 nm. As shown in FIG. 16, the wavefront of the laser beam passing through the common area RC has no continuity with the wavefront of the laser beam passing through the high NA exclusive area RE. Further, as shown in FIG. 17, the shift of the best focus position in the optical axis direction becomes significant when the working wavelength varies by ±5 nm. Particularly, when the wavelength increases, the minimum wavefront aberration exceeds $0.020\lambda$.

Figure 18:
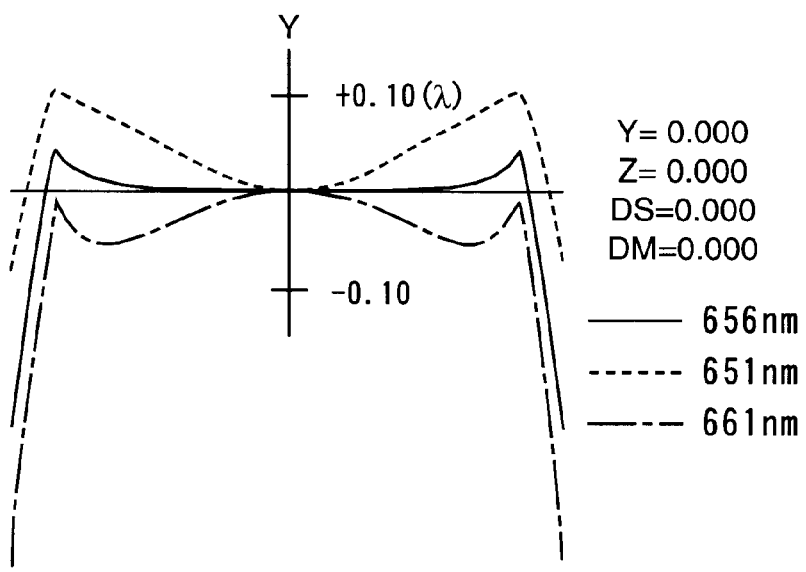
FIG. 18 is a graph showing a wavefront aberration of the optical system that employs the objective lens of the second compared example when the thin cover type optical disc is applied at the temperature that is higher than the standard temperature by 40 degrees.
Figure 19:
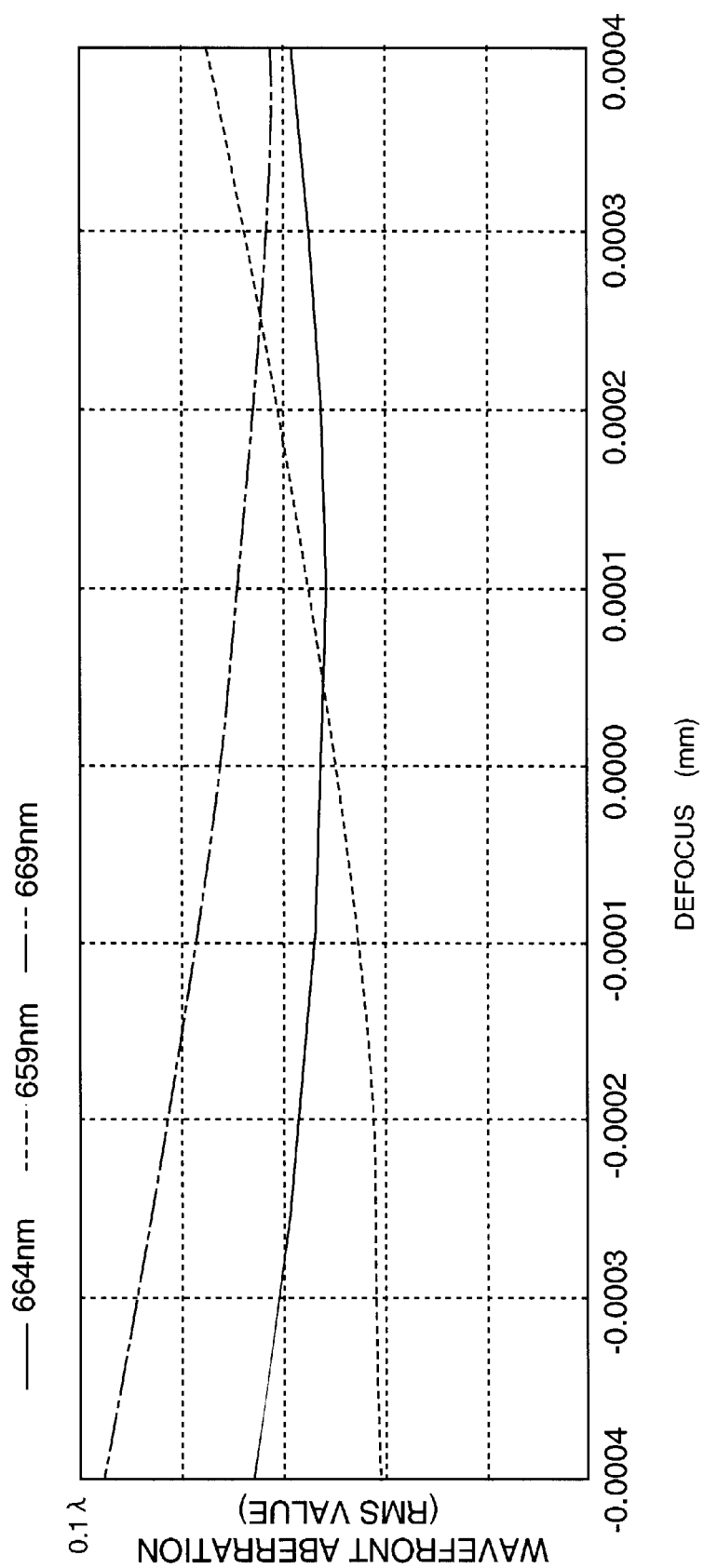
FIG. 19 is a graph showing a relationship between an rms value of the wavefront aberration and defocus in the optical system that employs the objective lens of the second compared example when the thin cover type optical disc is applied at the temperature that is higher than the standard temperature by 40 degrees.

FIGS. 18 and 19 show the aberrations of the optical system that employs the objective lens of the second comparative example when the thin cover type optical disc $D_1$ is applied at the temperature that is higher than the standard temperature by 40 degrees. Since the diffractive lens structure in the high NA exclusive area does not correct spherical aberration caused by the temperature change, the change of the refractive index causes the overcorrected spherical aberration, the wavefront aberration increases significantly. Since the minimum rms value of the wavefront aberration exceeds $0.05\lambda$ even at the design wavelength 656 nm, the beam spot can not be converged into the diameter required for reproducing a DVD.

Second Embodiment

TABLE 3 shows data of the objective lens 10 of the second embodiment. The common area RC satisfies $0 \leq h < 1.62$ and the high NA exclusive area RE satisfies $1.62 \leq h < 1.93$ (unit:mm). The diffractive lens structure is formed in both of the common area RC and the high NA exclusive area RE of the first surface 11. The diffractive lens structure formed within the common area RC is defined by the different optical path difference function from that for the high NA exclusive area RE. Additionally, a base curve of the common area RC is an aspherical surface that is different from the aspherical base curve of the high NA exclusive area. The second surface 12 is a continuous aspherical surface without steps.

TABLE 3

$NA_1 = 0.60$ $f_1 = 3.214$ $\lambda_1 = 659$ nm
$NA_2 = 0.50$ $f_2 = 3.236$ $\lambda_2 = 790$ nm First surface High-NA

|   | Common area (0 ≤ h < 1.62) | exclusive area (1.62 ≤ h < 1.93) | Second surface |
|---|---|---|---|
| r | 2.004 | 2.033 | −8.307 |
| κ | −0.480 | −0.480 | 0.0 |
| A4 | −2.09747 × 10⁻³ | −9.02700 × 10⁻⁴ | 2.00430 × 10⁻² |
| A6 | −3.84200 × 10⁻⁴ | −6.75000 × 10⁻⁵ | −7.51300 × 10⁻³ |
| A8 | −1.85400 × 10⁻⁴ | −5.56000 × 10⁻⁵ | −1.63800 × 10⁻³ |
| A10 | 3.52100 × 10⁻⁵ | −2.73200 × 10⁻⁵ | −1.98100 × 10⁻⁴ |
| A12 | −9.00000 × 10⁻⁶ | −9.40000 × 10⁻⁸ | 1.02900 × 10⁻⁵ |
| $P_{2C}, P_{2E}$ | −0.09161 | −3.00000 | — |
| $P_{4C}, P_{4E}$ | −1.96470 | −1.17700 | — |
| $P_{6C}, P_{6E}$ | −0.21942 | 0.10970 | — |
| $P_{8C}, P_{8E}$ | 0.0 | −0.03958 | — |
| $P_{10C}, P_{10E}$ | 0.0 | 0.0 | — |
| $P_{12C}, P_{12E}$ | 0.0 | 0.0 | — |
| $\lambda_B$ | 720 nm | 660 nm | — |
| ds | 1.3400 μm | 1.2237 μm | — |
| d |  |  | 2.080 |
| n659 |  |  | 1.54048 |
| n790 |  |  | 1.53653 |

Distances $h_{in}$, $h_{out}$ (unit:mm) to inner and outer edges from the optical axis of a ring area whose ring number is N and a width W (unit:mm) of this ring area are shown in TABLE 4 The ring areas whose ring numbers are 0 through 17 are included in the common area RC and the ring areas whose ring numbers are 18 through 29 are included in the high NA exclusive area RE.

TABLE 4

| N | $h_{in}$ | $h_{out}$ | W | N | $h_{in}$ | $h_{out}$ | W |
|---|---|---|---|---|---|---|---|
| 0 | 0.000 | 0.686 | 0.686 | 15 | 1.547 | 1.571 | 0.024 |
| 1 | 0.686 | 0.903 | 0.217 | 16 | 1.571 | 1.594 | 0.023 |
| 2 | 0.903 | 1.023 | 0.120 | 17 | 1.594 | 1.615 | 0.021 |
| 3 | 1.023 | 1.110 | 0.087 | 18 | 1.615 | 1.697 | 0.082 |
| 4 | 1.110 | 1.178 | 0.068 | 19 | 1.697 | 1.723 | 0.026 |
| 5 | 1.178 | 1.236 | 0.058 | 20 | 1.723 | 1.749 | 0.026 |
| 6 | 1.236 | 1.285 | 0.049 | 21 | 1.749 | 1.773 | 0.024 |
| 7 | 1.285 | 1.329 | 0.044 | 22 | 1.773 | 1.795 | 0.022 |
| 8 | 1.329 | 1.368 | 0.039 | 23 | 1.795 | 1.817 | 0.022 |
| 9 | 1.368 | 1.404 | 0.036 | 24 | 1.817 | 1.838 | 0.021 |
| 10 | 1.404 | 1.437 | 0.033 | 25 | 1.838 | 1.858 | 0.020 |
| 11 | 1.437 | 1.467 | 0.030 | 26 | 1.858 | 1.877 | 0.019 |
| 12 | 1.467 | 1.496 | 0.029 | 27 | 1.877 | 1.896 | 0.019 |
| 13 | 1.496 | 1.522 | 0.026 | 28 | 1.896 | 1.914 | 0.018 |
| 14 | 1.522 | 1.547 | 0.025 | 29 | 1.914 | 1.931 | 0.017 |

Figure 20:
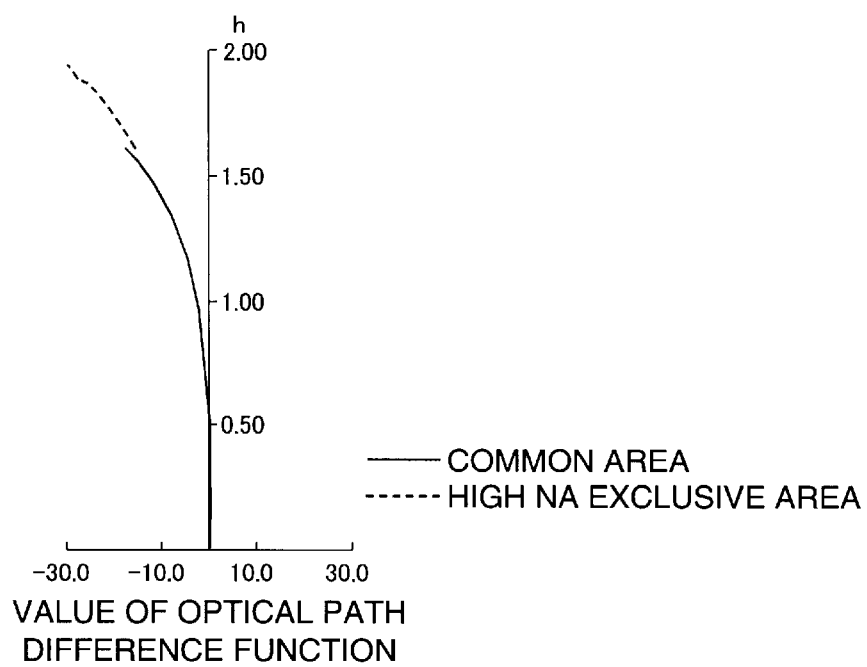
FIG. 20 is a graph showing values of the optical path difference function of a diffractive lens structure according to a second embodiment.
Figure 21:
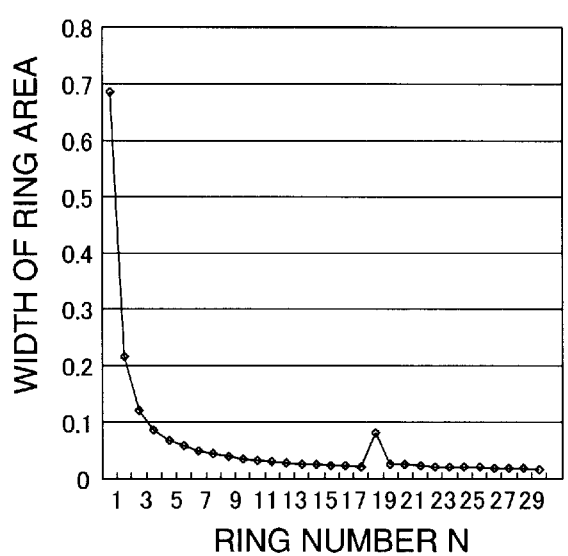
FIG. 21 is a graph showing a variation of a width of ring area of the diffractive lens structure according to the second embodiment.

FIG. 20 is a graph showing values of the optical path difference function of a diffractive lens structure according to the second embodiment. In the graph, a solid line indicates the values in the common area RC and a dotted line indicates the values in the high NA exclusive area RE. The horizontal axis denotes the optical path difference and the vertical axis denotes the distance from the optical axis. Further, FIG. 21 is a graph showing a variation of the width W indicated in TABLE 4. The width of the outer ring area is smaller than the adjacent inner ring area except 18th ring area at the boundary between the areas RC and RE. The 18th ring area is the extra-wide area as shown in FIG. 3B to make the orientations of all of the minute steps identical.

The performance of the objective lens 10 of the second embodiment will be described with reference to aberration diagrams of the optical system including the objective lens and the cover layer of the optical disc. FIGS. 22A, 22B and 23 show aberrations of the optical system when the thin cover type optical disc D₁ is applied at the standard temperature, FIG. 22A shows a spherical aberration SA and sine condition SC at the working wavelength 659 nm; FIG. 22B shows spherical aberrations at 654 nm, 659 nm and 664 nm; FIG. 23 shows wavefront aberrations at 654 nm, 659 nm and 664 nm. Like the first embodiment, the objective lens of the second embodiment is corrected in the spherical aberration. Further, the wavefront aberrations caused by a wavelength change can be kept small even when the thin cover type optical disc D1 is applied. The change of the aberrations due to a temperature change is also reduced.

As described above, according to the invention, a change of a spherical aberration due to a change of thickness of the cover layer is counterbalanced by the change of the spherical aberration due to the wavelength dependence of the diffractive lens structure. Further, since the laser beam passing through the high NA exclusive area diffuses when the thick cover type optical disc such as a CD or a CD-R is applied, the beam spot does not too small without employing an aperture mechanism.

The present disclosure relates to the subject matter contained in Japanese Patent Application No. HEI 11-375020, filed on Dec. 28, 1999, which is expressly incorporated herein by reference in its entirety.

What is claimed is:

1. An objective lens for an optical pick-up, comprising:
   a refractive lens having a positive refractive power; and
   a diffractive lens structure that is formed as a plurality of concentric ring areas having minute steps at the boundaries therebetween and is formed on at least one lens surface of said refractive lens,
   wherein said lens surface is divided into a high NA exclusive area through which a light beam of a first NA, which is necessary only for an optical disc having first recording density, passes, and a common area through which a light beam of a second NA, which is lower than said first NA and is necessary and sufficient for an optical disc having second recording density that is lower than said first recording density, passes,
   wherein the light beam of said first NA has a first wavelength and the light beam of said second NA has a second wavelength that is longer than said first wavelength;
   wherein said diffractive lens structure formed in said common area has such a wavelength dependence that spherical aberrations with different cover layers in thickness are corrected at said first and second wavelengths, respectively; and
   wherein said diffractive lens structure formed in said high NA exclusive area has a smaller wavelength dependence of a spherical aberration than that formed in said common area, and is designed such that a spherical aberration at said first wavelength is adequately corrected.

2. The objective lens for the optical pick-up according to claim 1, wherein the following conditions (1) and (2) are satisfied;

$$P_{2C} > P_{2E} \quad (1)$$

$$P_{4C} < P_{4E}, \; P_{4C} < 0 \quad (2)$$

when an additional optical path length added by said diffractive lens structure formed in said common area is expressed by the following optical path difference function $\Phi_C(h)$:

$$\Phi_C(h) = (P_{2C}h^2 + P_{4C}h^4 + P_{6C}h^6 + \ldots) \times m \times \lambda$$

where $P_{2C}$, $P_{4C}$ and $P_{6C}$ are coefficients of second, fourth and sixth orders, h is a height from the optical axis, and when an additional optical path length added by said diffractive lens structure formed in said high NA exclusive area is expressed by the following optical path difference function $\Phi_E(h)$:

$$\Phi_E(h)=(P_{2E}h^2+P_{4E}h^4+P_{6E}h^6+\ldots)\times m\times\lambda$$

where $P_{2E}$, $P_{4E}$ and $P_{6E}$ are coefficients of second, fourth and sixth orders.

3. The objective lens for the optical pick-up according to claim 2, wherein the width of the innermost ring area of said high NA exclusive area is larger than the width of the outermost ring area of said common area.

4. The objective lens for the optical pick-up according to claim 2, wherein said refractive lens is made of plastic, and said diffractive lens structure satisfies the following condition (3):

$$P_{4C}<P_{4E}<0. \tag{3}$$

5. The objective lens for the optical pick-up according to claim 4, wherein said diffractive lens structure formed in said high NA exclusive area has such a wavelength dependence that a change of a spherical aberration due to a variation of the refractive index of said refractive lens with a temperature change is compensated by a variation of emission wavelength of a semiconductor laser with a temperature change.

6. The objective lens for the optical pick-up according to claim 1, wherein said diffractive lens structure is formed such that an inner edge of a ring area is protruded with respect to the outer edge of the adjacent inner ring area in every pair of the inner and outer ring areas except the boundary between said common area and said high NA exclusive area, and wherein the outer edge of the outermost ring area in said common area is protruded with respect to the inner edge of the innermost ring area in said high NA exclusive area.

7. The objective lens for the optical pick-up according to claim 2, wherein said diffractive lens structure is formed such that an inner edge of the outer ring area is protruded with respect to the outer edge of the adjacent inner ring area in every pair of the adjacent inner and outer ring areas, and wherein the difference between the values of said optical path difference function $\Phi_E(h)$ at the inner edge and that at the outer edge of the innermost ring area in said high NA exclusive area is larger than one wavelength long.

8. An objective lens for an optical pick-up for use with an optical disk, comprising:

a refractive lens having a positive refractive power; and
a diffractive lens structure formed as a plurality of concentric stepped ring areas on at least one lens surface of said refractive lens, said diffractive lens structure having:
  a lower NA common area through which either of a first light beam and a second light beam are passed,
    said first light beam corresponding to a longer wavelength and an optical disk type having a lower recording density and a thicker cover layer,
    said second light beam corresponding to a shorter wavelength and an optical disk type having a higher recording density and a thinner cover layer,
    said diffractive lens structure in said lower NA common area having a first wavelength dependency of spherical aberration that is set to correct spherical aberration for said longer wavelength combined with said thicker cover layer at the same time as correcting spherical aberration for said shorter wavelength combined with said thinner cover layer; and
  a higher NA exclusive area through which said first light beam is also passed,
    said diffractive lens structure in said higher NA exclusive area having a second wavelength dependency of spherical aberration that is smaller than said first wavelength dependency of spherical aberration, and that is set to correct spherical aberration only at said shorter wavelength combined with said thinner cover layer.

9. The objective lens according to claim 8, wherein an additional optical path length added by said diffractive lens structure formed in said lower NA common area that is expressed by a first optical path difference function that is different from an additional optical path length added by said diffractive lens structure formed in said higher NA exclusive area that is expressed by a second optical path difference function.

10. The objective lens according to claim 8, wherein the width of the innermost concentric stepped ring area of said higher NA exclusive area is larger than the width of the outermost concentric stepped ring areas of said lower NA common area.

11. The objective lens according to claim 8, wherein said diffractive lens structure formed in said higher NA exclusive area has a wavelength dependence of spherical aberration that is set so that a change of a spherical aberration due to a variation of the refractive index of said refractive lens with temperature change is compensated by a variation of emission wavelength of a semiconductor laser with the temperature change.

12. The objective lens according to claim 8, wherein said diffractive lens structure is formed such that, at a boundary between said lower NA common area and said higher NA exclusive, an outer edge of the outermost concentric stepped ring area of said lower NA common area protrudes with respect to an inner edge of the innermost concentric stepped ring areas of said high NA exclusive area.

13. The objective lens according to claim 8, wherein said diffractive lens structure is formed such that a difference between values of said second optical path difference function at the inner edge and at the outer edge of the innermost concentric stepped ring area of said high NA exclusive area is larger than one wavelength long.

14. An objective lens for an optical pick-up for use with an optical disk, comprising:

a refractive lens having a positive refractive power; and
a diffractive lens structure formed as a plurality of concentric stepped ring areas on at least one lens surface of said refractive lens, said diffractive lens structure having:
  a lower NA common area through which either of a first light beam and a second light beam are passed, and
  a higher NA exclusive area through which said first light beam is also passed,
  said diffractive lens structure in said lower NA common area having a discontinuity with respect to the diffractive lens structure in said higher NA exclusive area, said discontinuity being defined by a difference between:
    (i) an additional optical path length added by said diffractive lens structure formed in said lower NA common area that is expressed by a first optical path difference function:

$$\Phi_C(h)=(P_{2C}h^2+P_{4C}h^4+P_{6C}h^6+\ldots)\times m\times\lambda$$

where $P_{2C}$, $P_{4C}$ and $P_{6C}$ are coefficients of second, fourth and sixth orders and h is a height from the optical axis, and (ii) an additional optical path length added by said diffractive lens structure formed in said higher NA exclusive area is expressed by a second optical path difference function:

$$\Phi_E(h) = (P_{2E}h^2 + P_{4E}h^4 + P_{6E}h^6 + \ldots) \times m \times \lambda$$

where $P_{2E}$, $P_{4E}$ and $P_{4E}$ are coefficients of second, fourth and sixth orders.

15. The objective lens according to claim 14, wherein:

$$P_{2C} > P_{2E}; \quad (1)$$

and $$P_{4C} < P_{4E}, P_{4C} < 0. \quad (2)$$

* * * * *